(12) United States Patent
Sugio et al.

(10) Patent No.: US 9,749,629 B2
(45) Date of Patent: Aug. 29, 2017

(54) IMAGE CODING APPARATUS, IMAGE CODING METHOD, AND IMAGE CODING SYSTEM

(71) Applicant: SUN PATENT TRUST, New York, NY (US)

(72) Inventors: Toshiyasu Sugio, Osaka (JP); Toru Matsunobu, Osaka (JP); Chong Soon Lim, Singapore (SG); Yi Xuan Zhang, Singapore (SG); Hai Wei Sun, Singapore (SG)

(73) Assignee: SUN PATENT TRUST, New York, NY (US)

( * ) Notice: Subject to any disclaimer, the term of this patent is extended or adjusted under 35 U.S.C. 154(b) by 376 days.

(21) Appl. No.: 14/682,005

(22) Filed: Apr. 8, 2015

(65) Prior Publication Data

US 2015/0341662 A1  Nov. 26, 2015

Related U.S. Application Data

(63) Continuation of application No. PCT/JP2014/002656, filed on May 21, 2014.

(60) Provisional application No. 61/841,459, filed on Jul. 1, 2013.

(51) Int. Cl.
*H04N 19/11* (2014.01)
*H04N 19/124* (2014.01)
*H04N 19/60* (2014.01)
*H04N 19/159* (2014.01)
*H04N 19/176* (2014.01)
*H04N 19/147* (2014.01)
*H04N 19/593* (2014.01)

(52) U.S. Cl.
CPC ............ *H04N 19/11* (2014.11); *H04N 19/124* (2014.11); *H04N 19/147* (2014.11); *H04N 19/159* (2014.11); *H04N 19/176* (2014.11); *H04N 19/593* (2014.11); *H04N 19/60* (2014.11)

(58) Field of Classification Search
CPC ....................................................... H04N 19/11
USPC ..................................................... 375/240.12
See application file for complete search history.

(56) References Cited

U.S. PATENT DOCUMENTS

2013/0016774 A1\* 1/2013 Oh ........................ H04N 19/176
375/240.03
2013/0272623 A1\* 10/2013 Jeon ...................... H04N 19/159
382/238

OTHER PUBLICATIONS

International Search Report of PCT application No. PCT/JP2014/002656 dated Aug. 5, 2014.

(Continued)

*Primary Examiner* — Yulin Sun
(74) *Attorney, Agent, or Firm* — Greenblum & Bernstein, P.L.C.

(57) ABSTRACT

Prediction directions for cost calculation are reduced by preferentially selecting a direction in which a prediction pixel is generated by direct copy without filtering from among intra prediction directions to perform intra prediction. In addition to the roughly selected prediction direction, an amount of processing is reduced while deterioration of coding efficiency is prevented through comparison with preferentially selected prediction, such as DC prediction and planar prediction, and selection of second-stage prediction direction focused on a vicinity of roughly selected prediction direction.

11 Claims, 31 Drawing Sheets

(56) References Cited

OTHER PUBLICATIONS

Manoj Alwani, et al., "A method for fast rough mode decision in HEVC, Data Compression Conference (DCC)" pp. 476, 2013.
"High efficiency video coding" Rec. ITU-T H.265, Apr. 2013.

* cited by examiner

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | – | 32 | 26 | 21 | 17 | 13 | 9 | 5 | 2 | 0 | -2 | -5 | -9 | -13 | -17 | -21 | -26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |

FIG. 20

| |
|---|
| VIDEO STREAM (PID=0x1011 MAIN VIDEO) |
| AUDIO STREAM (PID=0x1100) |
| AUDIO STREAM (PID=0x1101) |
| PRESENTATION GRAPHICS STREAM (PID=0x1200) |
| PRESENTATION GRAPHICS STREAM (PID=0x1201) |
| INTERACTIVE GRAPHICS STREAM (PID=0x1400) |
| VIDEO STREAM (PID=0x1B00 SUB VIDEO) |
| VIDEO STREAM (PID=0x1B01 SUB VIDEO) |

FIG. 23
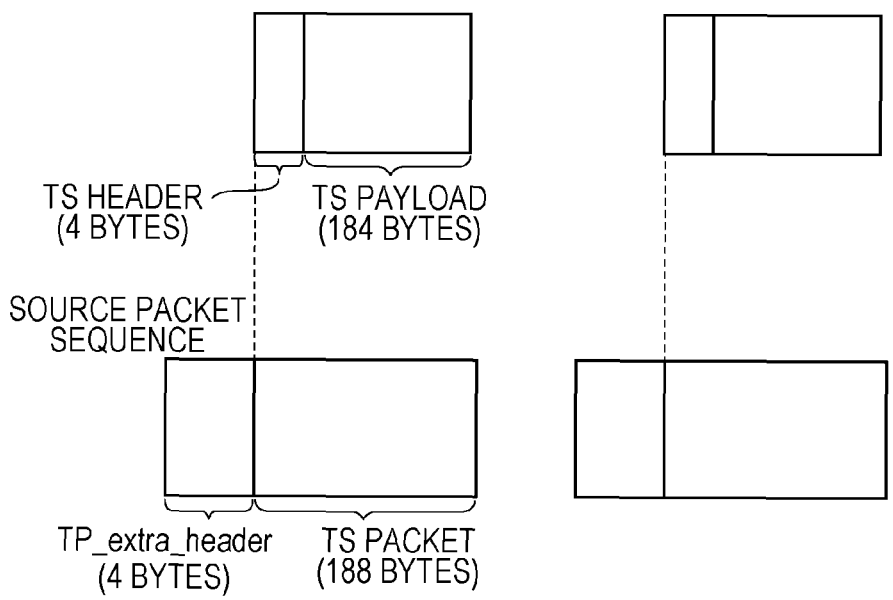
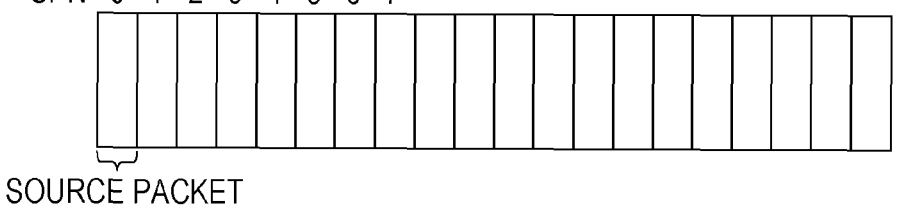

FIG. 31
| CONFORMING STANDARD | DRIVING FREQUENCY |
|---|---|
| MPEG4.AVC | 500MHz |
| MPEG2 | 350MHz |
| ⋮ | ⋮ |
FIG. 32A
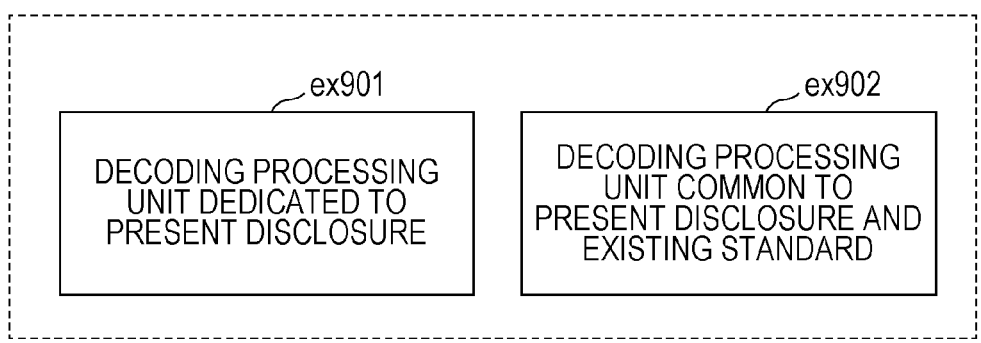
FIG. 32B
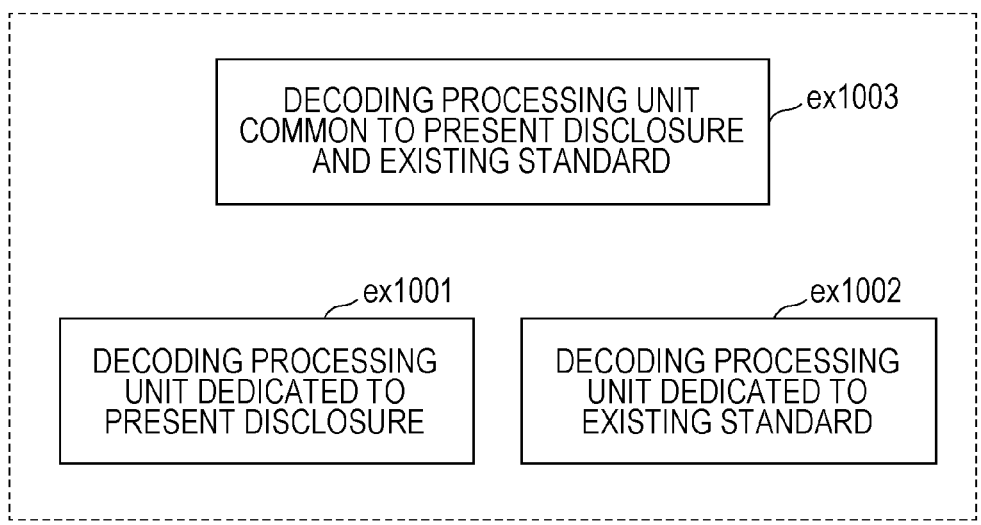

IMAGE CODING APPARATUS, IMAGE CODING METHOD, AND IMAGE CODING SYSTEM

CROSS REFERENCES TO RELATED APPLICATIONS

This application is a continuation application of PCT International Patent Application No. PCT/JP14/002656, filed on May 21, 2014, which claims priority to U.S. Provisional Patent Application No. 61/841,459, filed on Jul. 1, 2013, the contents of which are hereby incorporated by reference.

BACKGROUND OF THE INVENTION

1. Field of the Invention

The present disclosure relates to an image coding apparatus and an image coding method for adaptively estimating an intra prediction direction.

2. Description of the Related Art

In recent years, the H.265/HEVC (High-Efficiency Video Coding) standard has been developed as a new image coding standard (NPL 1 of Non-Patent Literature). The HEVC standard prescribes 35 prediction directions in intra prediction of a block (FIG. 1A) (for example, 33 ordinary prediction directions, one DC prediction direction, one planar prediction direction). In order to determine one prediction direction from 35 prediction directions, image coding apparatuses perform coding by using all the prediction directions. The image coding apparatuses then compare rate distortion optimization values in respective prediction directions to select the prediction direction in which the optimization value is smallest. In this way, performing coding in all the prediction directions and comparing the rate distortion optimization values will lead to higher coding efficiency, but on the other hand, to a larger amount of processing in performing coding.

CITATION LIST

Non-Patent Literature

NPL 1: H.265 (ISO/IEC 23008-2 HEVC)

SUMMARY OF THE INVENTION

The present disclosure relates to an image coding method for coding an object block included in an image, the image coding method including: a first selection step of selecting a first prediction direction from a first prediction direction set that is part of a plurality of previously determined prediction directions and includes two or more of the prediction directions; a second selection step of selecting a second prediction direction from a second prediction direction set that is another part of the plurality of prediction directions based on the first prediction direction; and an intra prediction step of performing intra prediction on the object block by using a plurality of pixels included in an adjacent block that is adjacent to the object block based on the second prediction direction.

Note that these comprehensive or specific aspects may be implemented by a system, an apparatus, an integrated circuit, a computer program, or a recording medium. These comprehensive or specific aspects may be implemented by an arbitrary combination of a system, an apparatus, a method, an integrated circuit, a computer program, and a recording medium.

BRIEF DESCRIPTION OF DRAWINGS

FIG. 20 is a diagram illustrating a structure of multiplexed data;

FIG. 23 is a diagram illustrating structures of a transport stream (TS) packet and a source packet in multiplexed data;

FIG. 31 is a diagram illustrating an example of a lookup table in which a video data standard and a driving frequency are associated with each other;

FIG. 32A is a diagram illustrating an example of a configuration that enables sharing of modules among signal processing units; and FIG. 32B is a diagram illustrating another example of a configuration that enables sharing of modules among signal processing units.

DETAILED DESCRIPTION OF THE PREFERRED EMBODIMENTS

Underlying Knowledge of Present Disclosure

Examination and comparison of all 35 intra prediction directions will cause an amount of processing in coding to become significantly large for a real-time or low-delay coding system. Meanwhile, examination and comparison may be limited to predictions to which high priority is given in HEVC, such as DC prediction and planar prediction, for example. In this case, however, there arises a problem that coding efficiency is reduced.

It is an object of the present disclosure to solve the above problem. Details of the present disclosure will be described below.

First Exemplary Embodiment

Figure 2:
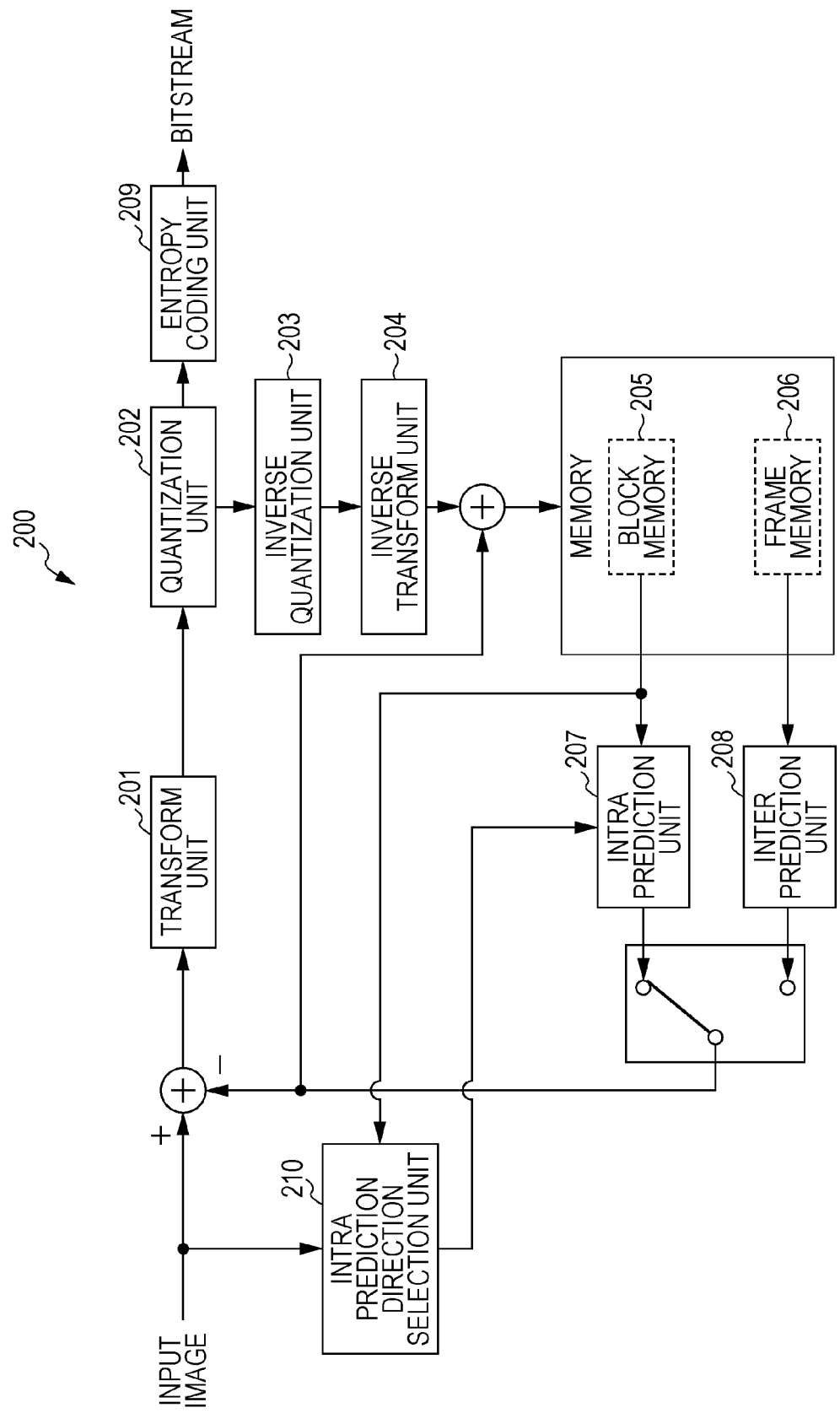
FIG. 2 is a block diagram illustrating an example of a configuration of an image coding apparatus according to the present disclosure.

FIG. 2 is a block diagram illustrating a configuration of image coding apparatus 200 for coding an image and/or video according to the present disclosure.

Image coding apparatus 200 codes an input image signal on a block-by-block basis and generates a bitstream that is a coded signal. As illustrated in FIG. 2, image coding apparatus 200 includes transform unit 201, quantization unit 202, inverse quantization unit 203, inverse transform unit 204, block memory 205, frame memory 206, intra prediction unit 207, inter prediction unit 208, entropy coding unit 209, and intra prediction direction selection unit 210. While separate memories of block memory 205 and frame memory 206 are described here, a common memory may be shared, of course.

The image signal corresponding to a block to be coded here is input into an adder and intra prediction direction selection unit 210. The adder outputs, to transform unit 201, a residual signal that is a difference value between the image signal and a prediction signal. Transform unit 201 transforms the difference value into a frequency coefficient, and outputs the frequency coefficient to quantization unit 202. Quantization unit 202 quantizes the input frequency coefficient, and outputs a quantized value. The quantized value is input into inverse quantization unit 203 and entropy coding unit 209. Entropy coding unit 209 codes the quantized value, and outputs the bitstream.

Transform unit 201 and quantization unit 202 may perform processes of generally orthogonal transform and quantization as a whole. The generally orthogonal transform and quantization are processes typically represented by multiplication of a matrix, and it is not necessarily required to separate the processes of transform and quantization. Quantization may be represented by terms "scaling" or "rounding."

Inverse quantization unit 203 performs inverse quantization on the quantized value that is output from quantization unit 202 into a frequency coefficient, and outputs the frequency coefficient to inverse transform unit 204. Inverse transform unit 204 performs inverse transform on the frequency coefficient, and outputs a pixel value of the bitstream, that is, a reconstructed residual signal, to an adder. The adder adds the pixel value of the bitstream to a predicted value that is output from intra prediction unit 207 or inter prediction unit 208, and outputs a reconstructed image that is an additional value to block memory 205 or frame memory 206.

Intra prediction unit 207 acquires an intra prediction direction from intra prediction direction selection unit 210. Intra prediction unit 207 then reads the reconstructed image from block memory 205, and generates an intra prediction image.

As will be described in detail later, intra prediction direction selection unit 210 searches the reconstructed image stored in block memory 205, or the input image signal, or both the reconstructed image and the input image signal, and performs cost calculation for each prediction direction, thereby selecting the intra prediction direction. Intra prediction direction selection unit 210 then outputs the selected intra prediction direction to intra prediction unit 207.

Inter prediction unit 208 searches the reconstructed image stored in frame memory 206, and estimates an image area that is closest to the input image signal.

Figure 3:
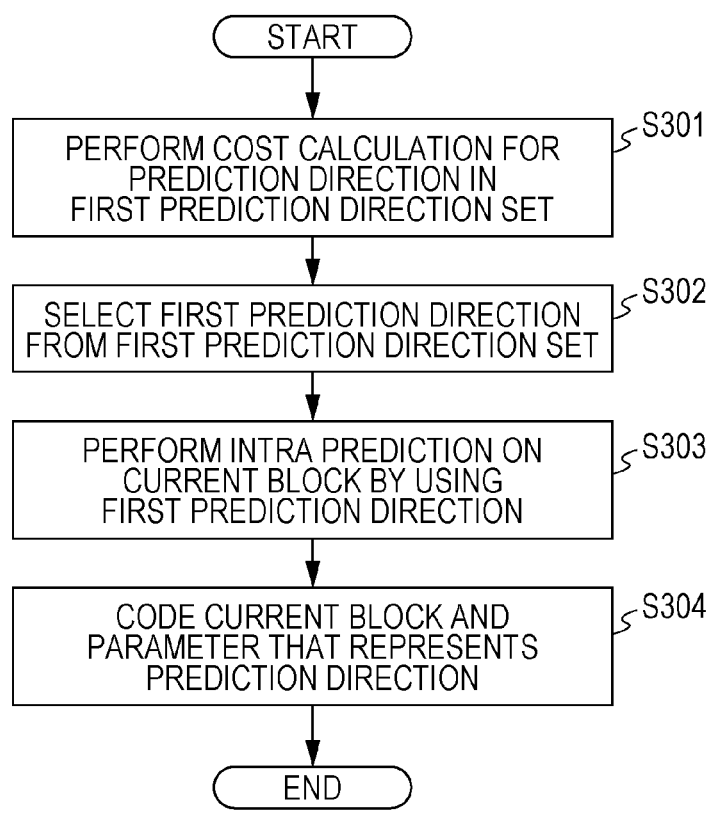
FIG. 3 is a flow chart illustrating an image coding process according to a first exemplary embodiment.
Figure 4:
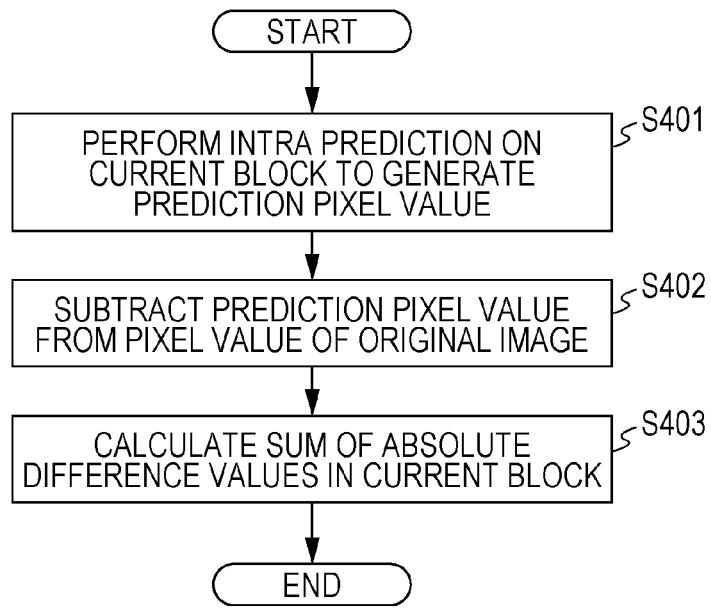
FIG. 4 is a flow chart illustrating an example of calculating a distortion amount as cost calculation.

FIG. 3 is a flow chart illustrating a coding process according to the present disclosure.

In step S301, cost calculation is performed for each of one or more prediction directions that are included in a previously determined first prediction direction set. The cost calculation is performed by, for example, calculation of a distortion amount. The distortion amount can be calculated as a sum of absolute pixel difference (SAD).

First, intra prediction is performed on a block to generate a prediction pixel value (S401), the prediction pixel value is subtracted from a pixel value of an original image of the block to calculate a difference value (S402), and the sum of absolute pixel difference in the block is calculated as the distortion amount (S403). The distortion amount is not limited to this example. The distortion amount may be a sum of squares of difference or the like, although the amount of processing increases a little.

Figure 5:
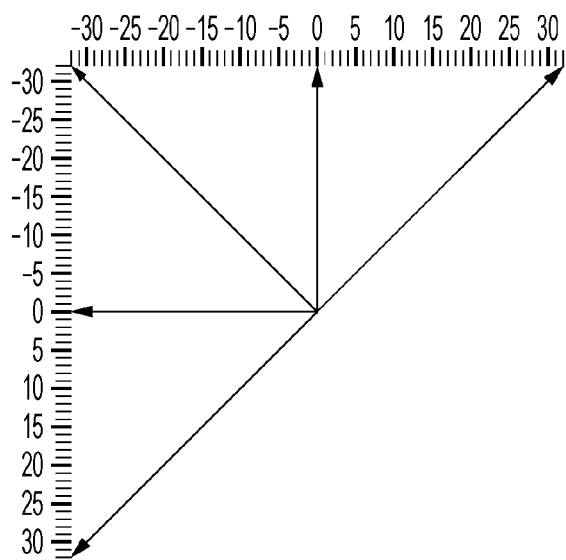
FIG. 5 illustrates an example of selection of a first prediction direction set.
Figure 6A:
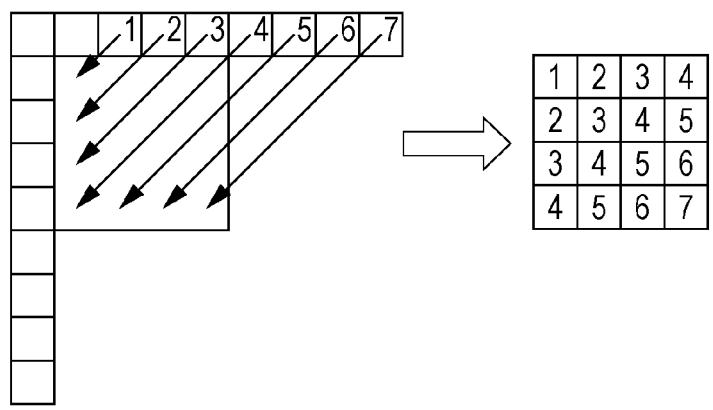
FIG. 6A is a schematic view of generating prediction pixels by making pixel copies in a prediction in a lower left direction.
Figure 6B:
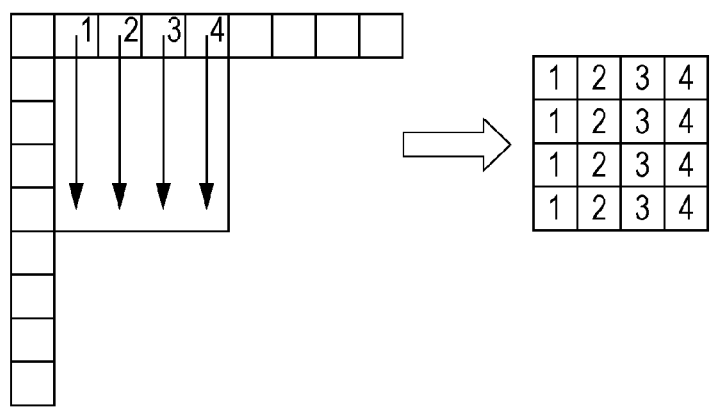
FIG. 6B is a schematic view of generating prediction pixels by making pixel copies in a prediction in a vertical direction.
Figure 6C:
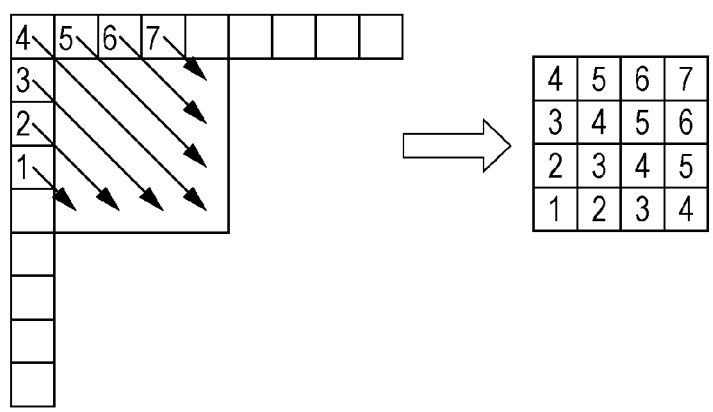
FIG. 6C is a schematic view of generating prediction pixels by making pixel copies in a prediction in a lower right direction.
Figure 6D:
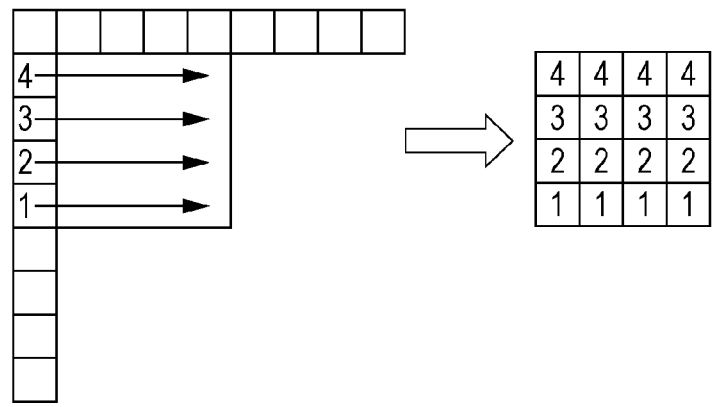
FIG. 6D is a schematic view of generating prediction pixels by making pixel copies in a prediction in a horizontal direction.
Figure 6E:
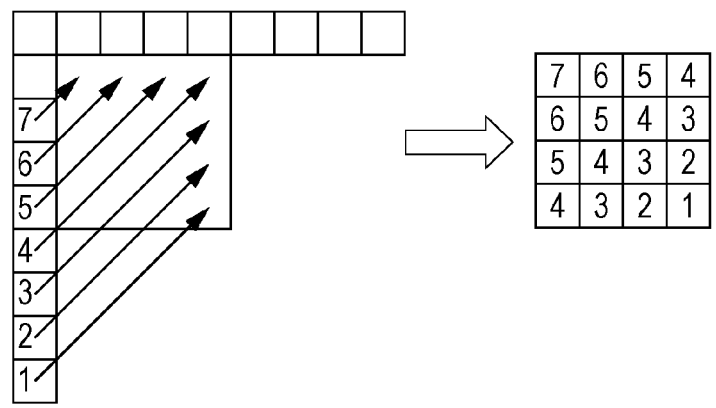
FIG. 6E is a schematic view of generating prediction pixels by making pixel copies in a prediction in an upper right direction.

Here, the first prediction direction set includes, for example, at least one of five intra prediction directions of a lower left direction, a vertical direction, a lower right direction, a horizontal direction, and an upper right direction, as illustrated in FIG. 5. Each of the five intra prediction directions has an inclination that differs from an inclination of an adjacent intra prediction direction by 45 degrees. Intra prediction pixels are generated by direct reproduction of reference pixels in neighboring blocks along each of these five intra prediction directions. Here, the direct reproduction refers to the use of a value of the reference pixel as it is without a filtering process of weighting calculation or the like. In FIGS. 6A to 6E, symbols 1 to 7 each represent the directly reproduced reference pixel for generating the intra prediction pixel.

Figure 7:
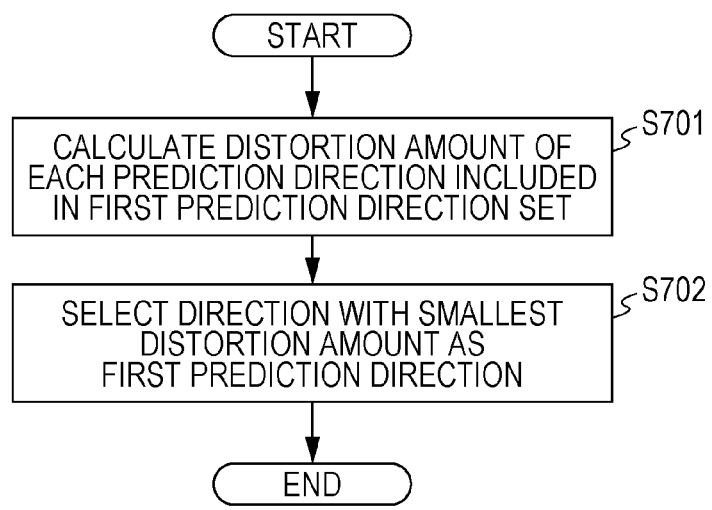
FIG. 7 is a flow chart illustrating an example of selecting a first prediction direction based on the distortion amount.

In step S302, a first prediction direction is selected from the first prediction direction set. For example, the distortion amount is used to select a prediction direction having the minimized distortion amount as the first prediction direction. FIG. 7 illustrates a flow chart for showing a process of selecting the prediction direction based on the distortion amount. In step S701, the distortion amounts of the first prediction direction set is calculated. In step S702, the prediction direction with the smallest distortion amount is selected.

Figure 8:
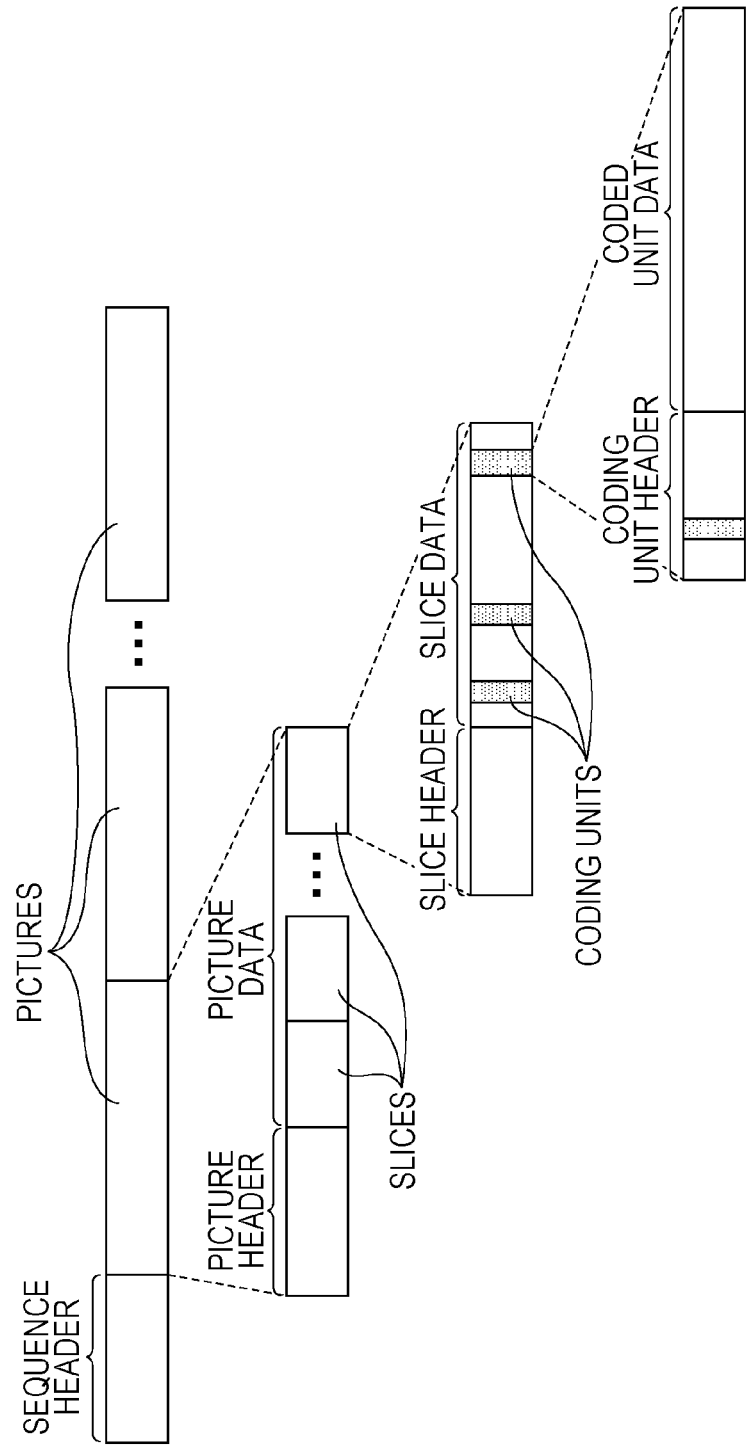
FIG. 8 is a diagram illustrating a syntax example in which parameters that represent prediction directions are arranged.

In step S303, intra prediction is performed on a current block by using the selected first prediction direction to generate a prediction image. In step S304, the residual signal obtained by subtracting the prediction image from the original image is coded for the current block to generate the bitstream. Moreover, a parameter that represents the first prediction direction is coded in a header of the bitstream. As illustrated in FIG. 8, the bitstream includes a sequence header that is a header of a sequence that includes one or more images (pictures), picture headers corresponding to the one or more images (pictures), slice headers in the pictures, headers of coding units that are a unit of coding included in areas called slices or tiles in the pictures (for example, slice segments). The parameter that represents the prediction direction is coded in the coding unit headers.

Figure 9:
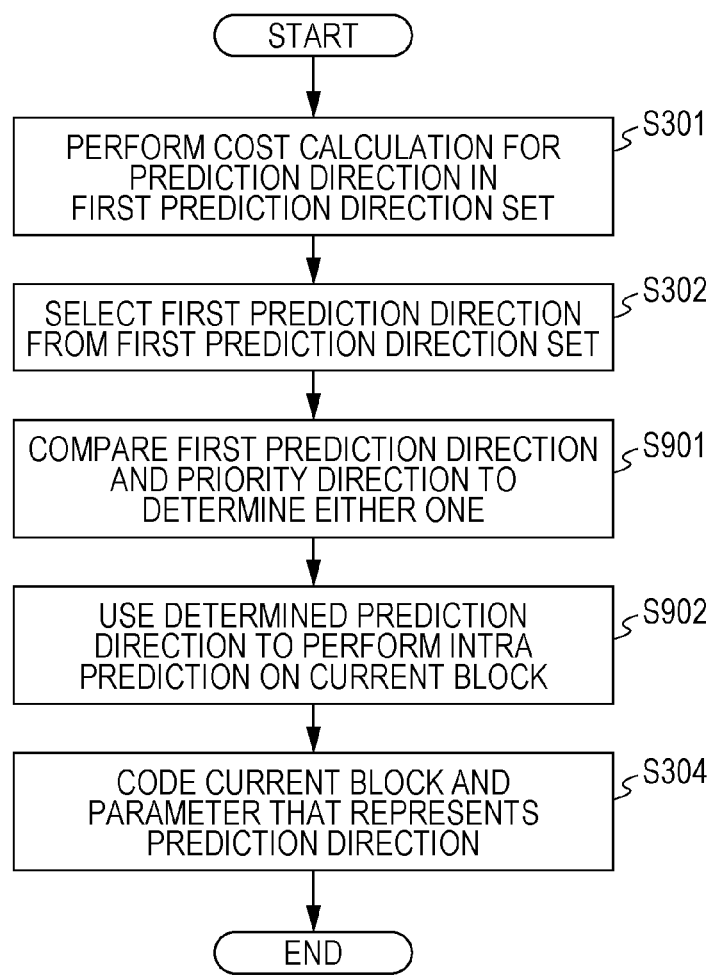
FIG. 9 is a flow chart illustrating another example of the image coding process according to the first exemplary embodiment.

In this way, intra prediction is performed only in the prediction direction in which direct reproduction can generate the prediction image, thereby significantly reducing the amount of processing. In this case, however, coding efficiency will be somewhat sacrificed. Accordingly, as illustrated in FIG. 9, the process of steps S901 and S902 may be performed instead of step S303.

In step S901, the distortion amounts are compared between the first prediction direction selected in S302 and a previously determined priority direction, to determine the prediction direction in which the distortion amount is smallest. Here, the priority direction may be, for example, two directions of DC prediction and planar prediction prescribed in HEVC for easy selection, and may be previously set to be either one of the two directions. The priority direction may be adaptively set, such as determining a direction of a general average of the prediction directions selected in a plurality of already coded adjacent blocks as the priority direction.

In step S902, the determined prediction direction is used to perform intra prediction on the current block and to generate the prediction image.

This configuration generally makes it possible to achieve excellent implementation that allows efficient cost calculation and that allows reduction of the amount of processing while preventing decline in coding efficiency, the cost calculation being performed on the prediction direction in which the reference pixels are directly reproduced and on the priority direction with a stronger likelihood of selection from among the prediction directions although filtering processing is needed.

Second Exemplary Embodiment

It is an object of a coding process according to the present exemplary embodiment to further improve coding efficiency although an amount of processing increases by adding another-stage determination of prediction directions to determination of prediction directions according to the first exemplary embodiment.

Figure 10:
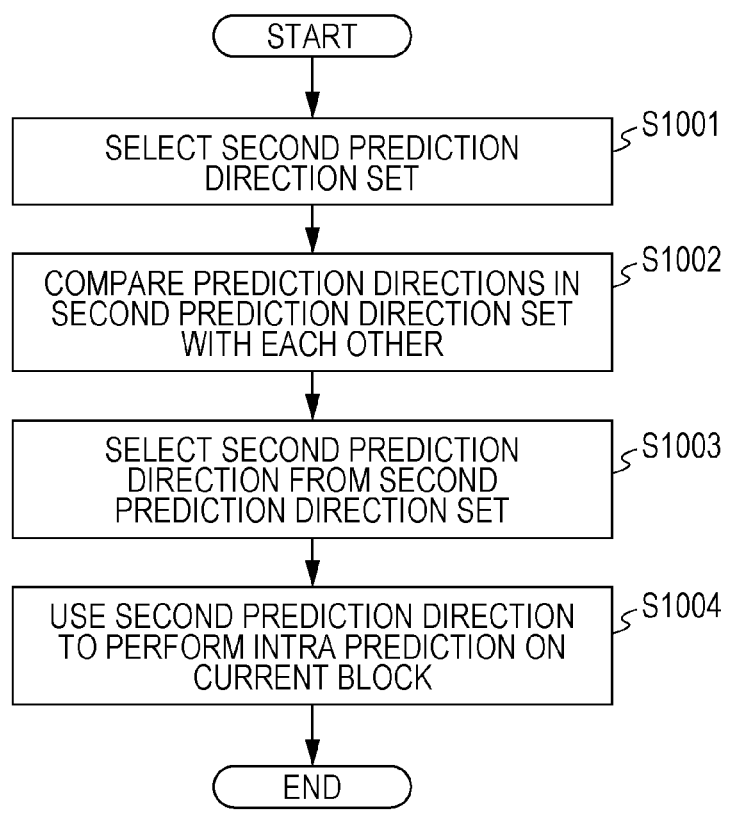
FIG. 10 is a flow chart illustrating a selection method of second-stage prediction directions in an image coding process according to a second exemplary embodiment.

FIG. 10 is a flow chart illustrating a feature of a coding process according to a second exemplary embodiment. This flow chart illustrates a process to be performed instead of step S303 of FIG. 3 described in the first exemplary embodiment. That is, in the coding process according to the present exemplary embodiment, steps S1001 to S1004 are performed after steps S301 and S302, and then step S304 is performed. Alternatively, steps S1001 to S1004 may be performed after step S901 of FIG. 9 illustrated as a variation of FIG. 3, and then step S304 may be performed. The flow chart will be described below with reference to FIG. 10.

Next, in step S1001, a second prediction direction set is selected from a plurality of previously determined prediction direction sets by using a first prediction direction or priority direction determined in step S302 or S901.

Figure 1A:
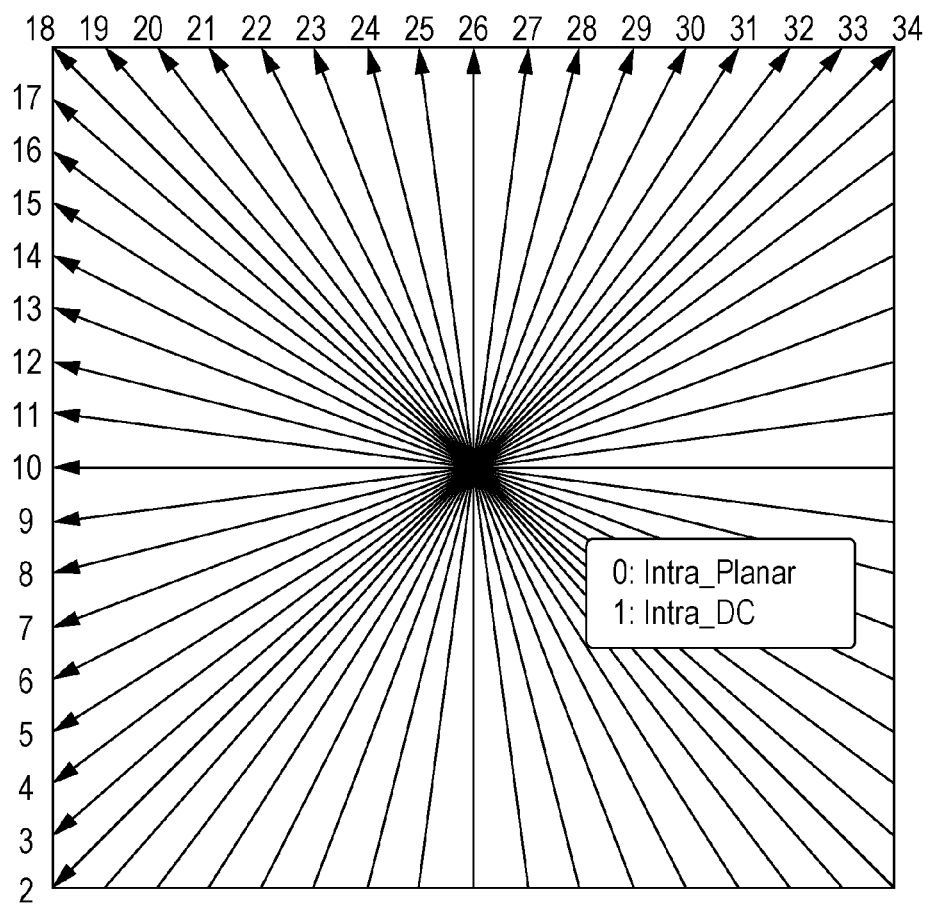
FIG. 1A is a diagram illustrating prediction directions of intra prediction in HEVC and indices of the prediction directions.
Figures 1B, 1C:
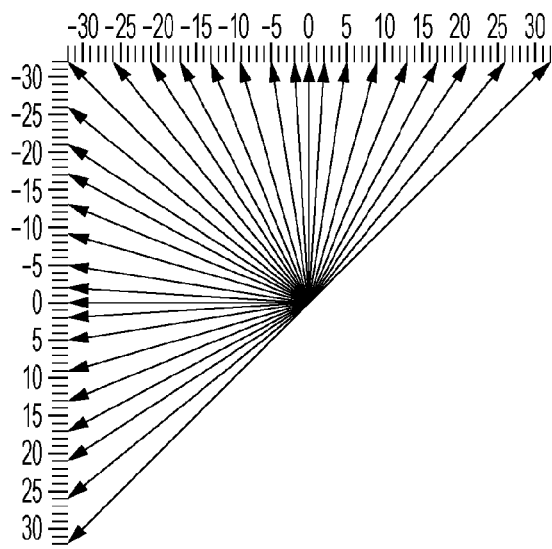
FIG. 1B is a diagram illustrating intra prediction directions and angles of the prediction directions.
FIG. 1C is a diagram illustrating a mapping table of the indices of the intra prediction directions and the intra prediction angles.

First, an example of performing a process of step S1001 after step S302 will be described. For example, assume that intra prediction direction 10 illustrated in FIG. 1A is selected as the first prediction direction. In this case, the second prediction direction set is selected to include seven intra prediction directions including the first prediction direction. The seven intra prediction directions are the first prediction direction, two adjacent prediction directions each different from the first prediction direction by one direction (for example, intra prediction directions 9 and 11 illustrated in FIG. 1A), two adjacent prediction directions each different from the first prediction direction by two directions (for example, intra prediction directions 8 and 12 illustrated in FIG. 1A), DC prediction, and planar prediction. Alternatively, the seven intra prediction directions may be the first prediction direction, two adjacent prediction directions each different from the first prediction direction by two directions (for example, intra prediction directions 8 and 12 illustrated in FIG. 1A), two adjacent prediction directions each different from the first prediction direction by four directions (for example, intra prediction directions 6 and 14 illustrated in FIG. 1A), DC prediction, and planar prediction. Although the seven intra prediction directions are mentioned in the above description, the number is not limited to this example. The second prediction direction set may be selected to include three or five intra prediction directions.

Figure 11:
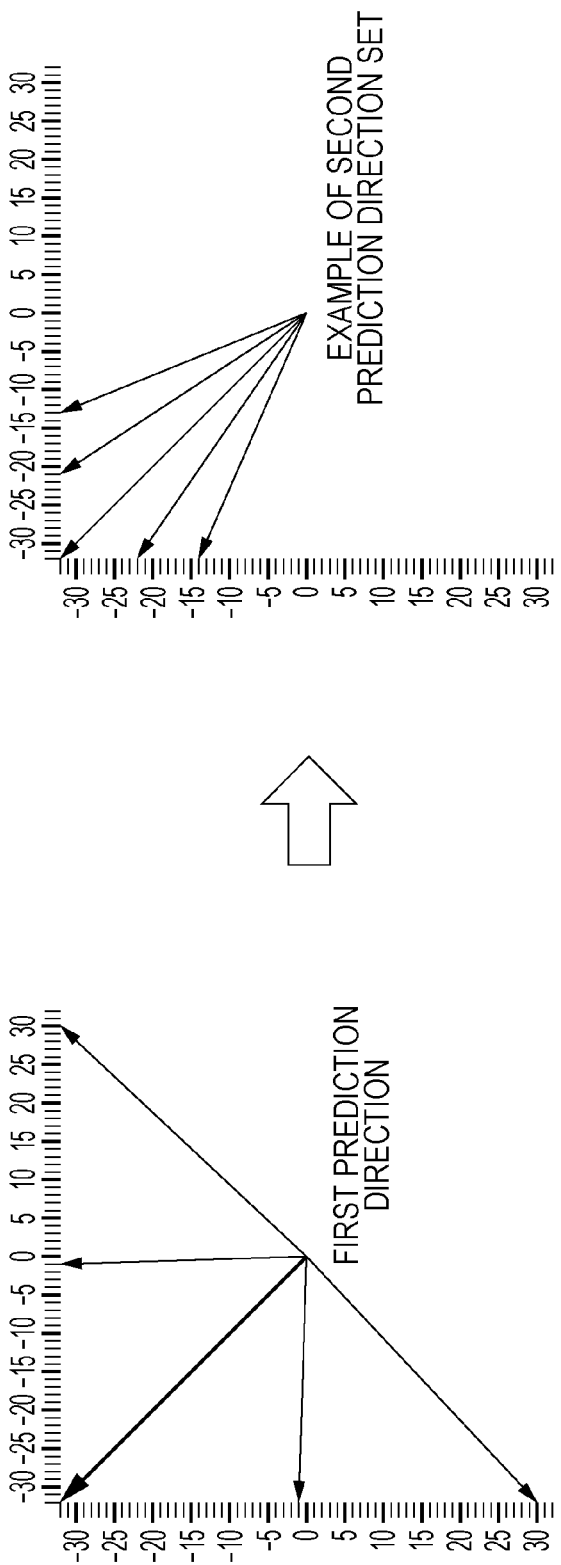
FIG. 11 is a schematic view illustrating a selection example of a second prediction direction set based on the first prediction direction.

FIG. 11 is a diagram illustrating an example of selection of the second prediction direction set by using the first prediction direction. As illustrated in FIG. 11, the second prediction direction set is determined such that, when the first prediction direction having the smallest distortion amount is selected from a first prediction direction set, the second prediction direction set includes adjacent prediction directions adjacent to the first prediction direction. The distortion amount here is, for example, sum of absolute values of differences between pixel values of an original image and pixel values of a prediction image.

Subsequently, the following describes a case where the process of step S1001 is performed after step S901. Since comparison has already been made with the prediction direction selected in S901 as the priority direction, when the first prediction direction has been determined based on a comparison result, the second prediction direction set may be selected so as not to include the already compared priority direction.

However, for example, when the DC prediction and/or planar prediction are included as the priority direction and either one is determined, the process of steps S1001 to S1004 may be omitted. This is because, among the 35 prediction directions, the DC prediction and planar prediction do not specifically indicate "a certain direction", unlike 33 prediction directions called angular prediction directions, and because the DC prediction and planar prediction are inconsistent with purport of new selection from nearby direction sets. When the priority direction is adaptively set by using information on an adjacent block or the like, a method of selecting the prediction directions included in the second prediction direction set may be changed depending on whether a difference of the distortion amount is large between the first prediction direction and the priority direction. Details will be described later.

In step S1002, the distortion amounts of the prediction directions included in the second prediction direction set are compared with each other. In step S1003, the prediction direction in which the distortion amount becomes smallest is selected as a second prediction direction. Of course, the method is not limited to using the distortion amount, and another method capable of cost calculation may be used. A method with minimum cost is selected.

In step S1004, the second prediction direction is used to perform intra prediction on a current block and to generate the prediction image.

Figure 12:
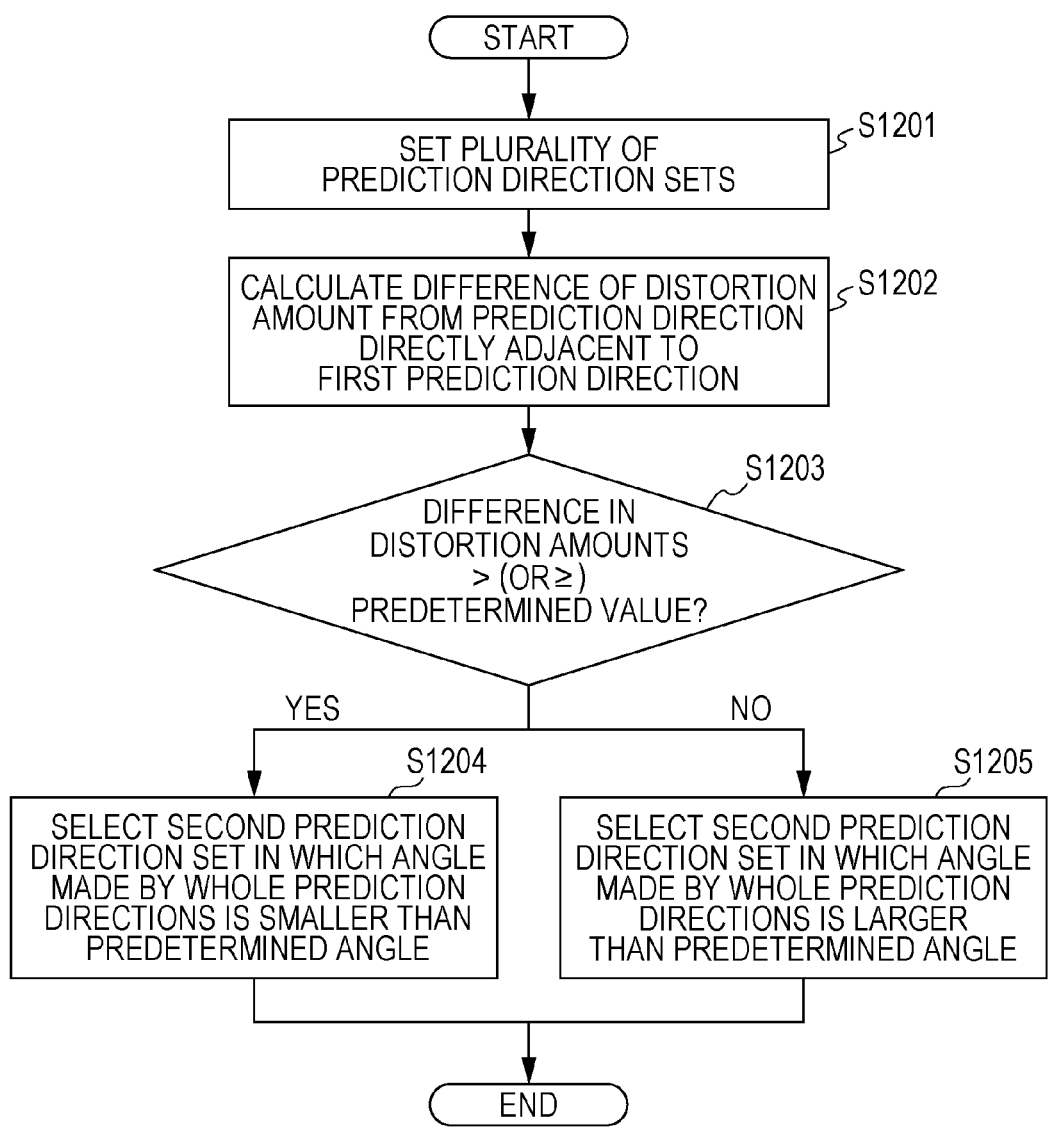
FIG. 12 is a flow chart illustrating another example of the selection method of second-stage prediction directions.

FIG. 12 is a flow chart illustrating another example of methods of determining the second prediction direction set in S1001. As described above, in step S1201, the plurality of prediction direction sets are set by a plurality of previously determined methods, such as including in total four prediction direction sets of every two or every three adjacent prediction direction sets.

In step S1202, a calculation of a difference is made between the distortion amount (SAD0) of the first prediction direction, and the distortion amounts (SAD1, SAD2) of one or more prediction directions that are directly adjacent to the first prediction direction and that are included in the first prediction direction set.

Figure 13:
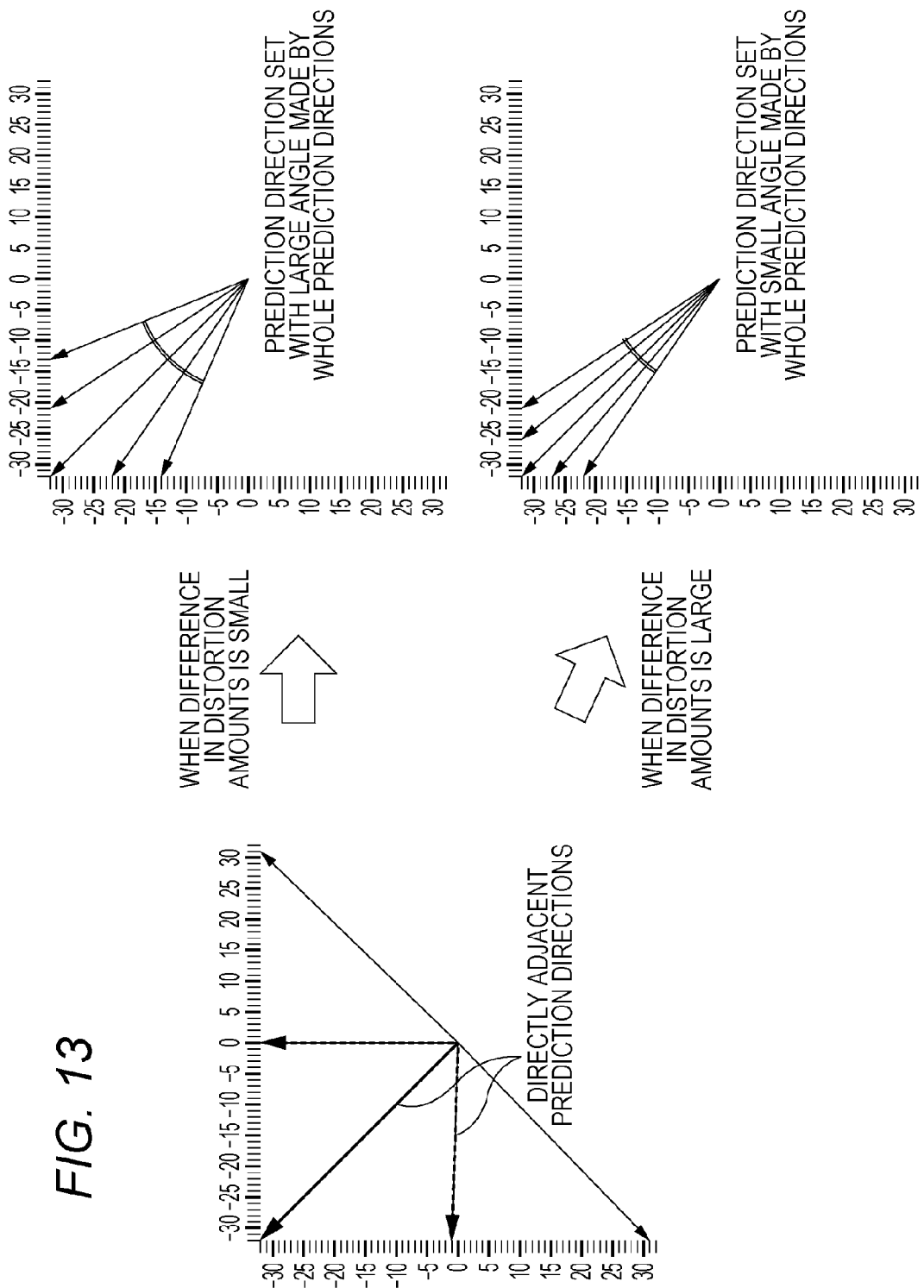
FIG. 13 is a schematic view illustrating a selection example of the second prediction direction set.
Figure 14:
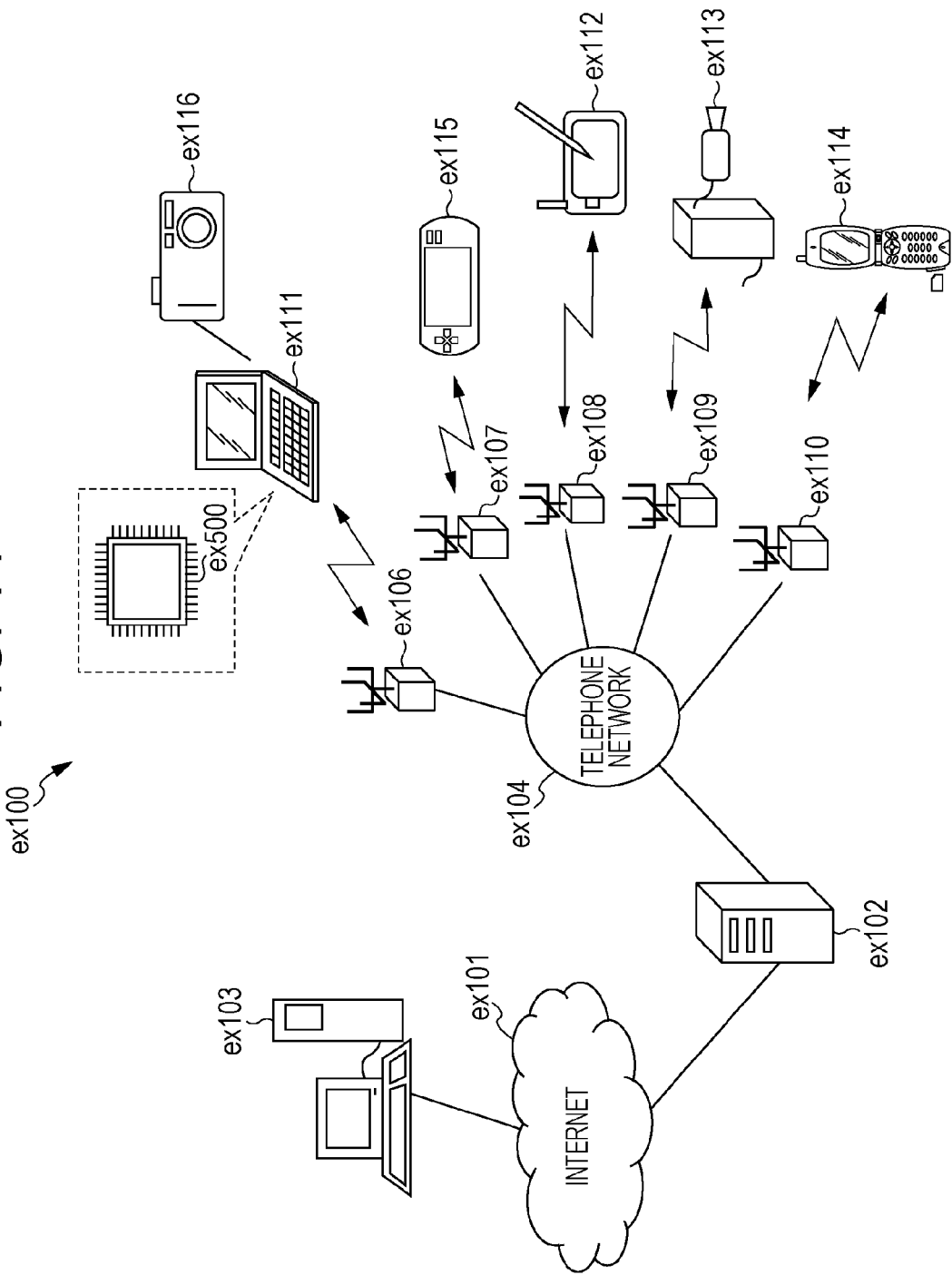
FIG. 14 is an overall configuration diagram of a content providing system that implements content distribution services.

In step S1203, a comparison is made whether the difference in the distortion amounts is larger than (or equal to or larger than, or less than) a predetermined value that is previously determined. In step S1204, when a result of step S1203 is affirmative (that is, when the difference in the distortion amounts is larger than the predetermined value), as the second prediction direction set, a prediction direction set is selected in which an angle made by a whole of all the prediction directions included in the prediction direction set is smaller than the predetermined angle, from among the plurality of prediction direction sets. In step S1205, when the result of step S1203 is negative (that is, when the difference in the distortion amounts is smaller than the predetermined value), as the second prediction direction set, a prediction direction set is selected in which an angle made by the whole prediction directions is larger than the predetermined angle. FIG. 13 is a schematic view of this selection method. When the difference in the distortion amounts is small between the first prediction direction and the prediction direction that is directly adjacent to the first prediction direction, it is likely that the first prediction direction is not a conspicuously low-cost direction. That is, since it is likely that an optimal prediction direction does not exist in a vicinity of the first prediction direction, searching a certain degree of wider range for the prediction direction will increase likelihood of determining an appropriate prediction direction. Accordingly, as illustrated in FIG. 13, the prediction direction set having an angle larger than the predetermined angle is selected as the second prediction direction set, the angle being made by the whole prediction directions included in the set. On the other hand, when the difference in the distortion amounts is large, it is likely that the optimal prediction direction exists in the vicinity of the first prediction direction, and thus the prediction direction set having a small angle made by the whole prediction directions is selected as the second prediction direction set. The predetermined angle may be literally the predetermined angle that is previously set, and may be an angle represented by indices to which numbers are assigned in order from a larger (or smaller) angle made by the whole prediction directions in the plurality of prediction direction sets. The finally determined set may be adaptively selected such that the angle made by the whole prediction directions is determined by a size of the difference in the distortion amounts.

Note that in FIG. 13, the prediction directions are uniformly distributed such that angle differences between the respective prediction directions in the set become equal to each other, but absolute values of the angle differences between the respective prediction directions do not need to be equal to each other. For example, the five prediction directions may be the first prediction direction, two adjacent prediction directions that are each different from the first prediction direction by one direction, and two adjacent prediction directions that are each different from the first prediction direction by three directions.

Note that, as illustrated in FIG. 13, when there are two prediction directions that are directly adjacent to the first prediction direction, the prediction direction having a smaller distortion amount is selected in step S1203, but the method is not limited to this case. Determination may be made whether both the absolute values (|SAD1−SAD0| and |SAD2−SAD0|) of the differences in the distortion amounts are larger than the predetermined value, and determination may be made with the absolute value in only one of the two directions in which the number that indicates the prediction direction becomes smaller. Moreover, when both the absolute values differ in a degree that is not negligible, as illustrated in FIG. 13, the prediction direction set that is deviated to either one side may be selected, instead of the prediction direction set uniformly distributed centered on the first prediction direction.

Calculation and selection of the distortion amounts are mentioned here for description. However, since the first prediction direction is usually selected after these calculations are made, the distortion amount may be calculated simultaneously at this time.

In this way, an excellent effect is achieved such that coding efficiency does not easily deteriorate while the amount of processing is reduced, according to the configuration that allows determination of the angle made by the whole prediction directions included in the second intra prediction direction set by using the difference in the distortion amounts of the prediction directions included in the first prediction direction set.

The method of uniquely selecting the second prediction direction set created by the previously determined method in step S1001, and the method of selecting the second prediction direction set from the plurality of prediction direction sets in steps S1201 to S1204 may be switched in accordance with predetermined conditions. For example, when the distortion amount of the first prediction direction is conspicuously small, unique section may be made, and otherwise, the method may be switched to performing the process of steps S1201 to S1204. This determination may be made by comparison of the distortion amount of the first prediction direction with a predetermined threshold. This determination may be made by comparison of a predetermined threshold with a difference between the distortion amount of the first prediction direction and the distortion amount of the prediction direction with a second smallest distortion amount. The methods may be switched based on prediction information on adjacent blocks. For example, when the prediction directions selected in the adjacent blocks are inconsistent, the process of steps S1201 to S1204 may be performed to search for more appropriate prediction directions. When the prediction directions selected in the adjacent blocks show mostly a vicinity of the first prediction direction, the prediction directions may be uniquely selected.

When the priority direction is selected instead of the first prediction direction in accordance with the process illustrated in FIG. 9, the process of FIG. 12 is omitted in a case of DC prediction or planar prediction. In other cases, the process of FIG. 12 may be similarly performed centering on the direction.

The aforementioned configuration allows the coding apparatus according to the present exemplary embodiment to prevent decline in the coding efficiency while reducing the amount of processing.

Third Exemplary Embodiment

The processes described in each of the first and second exemplary embodiments above can be implemented easily in a standalone computer system by recording a program for implementing the configuration of a video coding method (image coding method) or video decoding method (image decoding method) described in the exemplary embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video coding method (image coding method) or the video decoding method (image decoding method) described in each of the first and second exemplary embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 15:
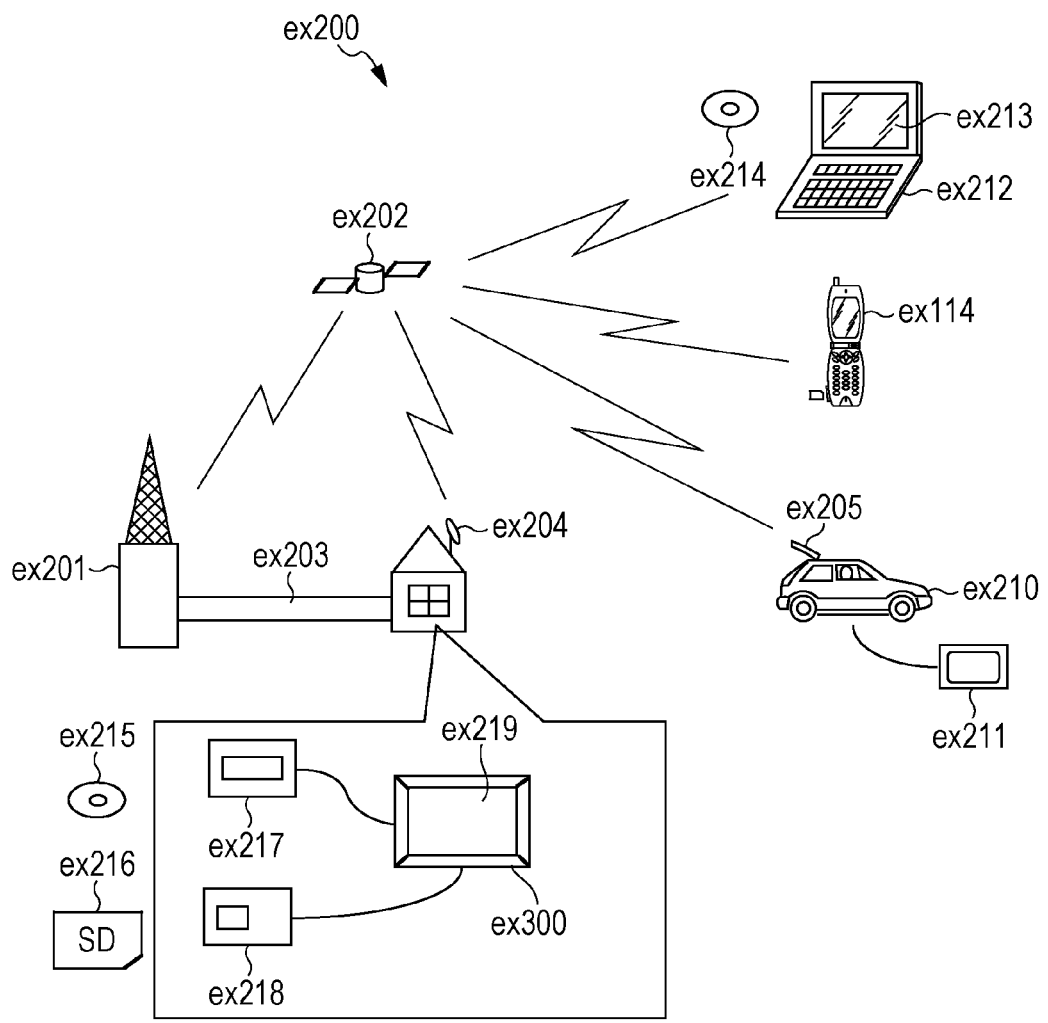
FIG. 15 is a diagram illustrating an overall configuration of a digital broadcasting system.

FIG. 15 is a diagram illustrating an overall configuration of content providing system ex100 that implements content distribution services. An area in which communication services are provided is divided into cells of a desired size. Base stations ex106, ex107, ex108, ex109, and ex110, which are fixed wireless stations, are installed in the respective cells.

In content providing system ex100, various devices, such as computer ex111, PDA (Personal Digital Assistant) ex112, camera ex113, mobile phone ex114, game machine ex115 are connected to Internet ex101 via Internet service provider ex102, telephone network ex104, and base stations ex106 to ex110.

Note that the configuration of content providing system ex100 is not limited to the configuration illustrated in FIG. 15, and any given combination of the elements may be connected. Also, the individual devices may be directly connected to telephone network ex104 instead of via base stations ex106 to ex110 which are fixed wireless stations. Alternatively, the individual devices may be directly interconnected via near field communication or the like.

Camera ex113 is a device capable of capturing moving images, such as a digital camcorder. Camera ex116 is a device capable of capturing still images and moving images, such as a digital camera. Also, mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In content providing system ex100, camera ex113 or the like is connected to streaming server ex103 via base station ex109 and telephone network ex104. In this way, live streaming is implemented. During live streaming, the coding process is performed on content (for example, video of a music event) obtained by the user using camera ex113 in a manner as described in each of the above-described exemplary embodiments (that is, camera ex113 functions as an image coding apparatus according to one aspect of the present disclosure) and the resulting content is transmitted to streaming server ex103. Streaming server ex103 in turn distributes the received content as a stream to a client that has made a request. Examples of the client include computer ex111, PDA ex112, camera ex113, mobile phone ex114, and game machine ex115 capable of decoding the data that has undergone the coding process. Each device that has received the distributed data performs the decoding process on the received data to reproduce the data (that is, the device functions as an image decoding apparatus according to one aspect of the present disclosure).

Note that the coding process may be performed on the obtained data by camera ex113, by streaming server ex103 that performs a data transmission process, or by both of them on a processing-sharing basis. Similarly, the decoding process may be performed on the distributed data by the client, by streaming server ex103, or by both of them on a processing-sharing basis. Also, in addition to still and/or moving image data obtained by camera ex113, still and/or moving image data obtained by camera ex116 may be transmitted to streaming server ex103 via computer ex111. In this case, the coding process may be performed by any of camera ex116, computer ex111, and streaming server ex103, or by all of them on a processing-sharing basis.

These coding and decoding processes are performed in general by LSI ex500 included in computer ex111 or each device. LSI ex500 may be formed as a single chip or a plurality of chips. Alternatively, software for video coding/decoding may be recorded on a recording medium (such as a CD-ROM, a flexible disk, or a hard disk) that is readable by computer ex111 or the like, and the coding and decoding processes may be performed using the software. Further, in the case where mobile phone ex114 is equipped with a camera, moving image data obtained with the camera may be transmitted. This moving image data is data that has been coded by LSI ex500 included in mobile phone ex114.

Also, streaming server ex103 may be constituted by a plurality of servers or a plurality of computers that process, record, and distribute data in a distributed manner.

In the above-described manner, content providing system ex100 allows the client to receive and reproduce coded data. Accordingly, content providing system ex100 allows the client to receive, decode, and reproduce information transmitted by a user in real time, and thus allows a user not having a special right or equipment to implement personal broadcasting.

Figure 16:
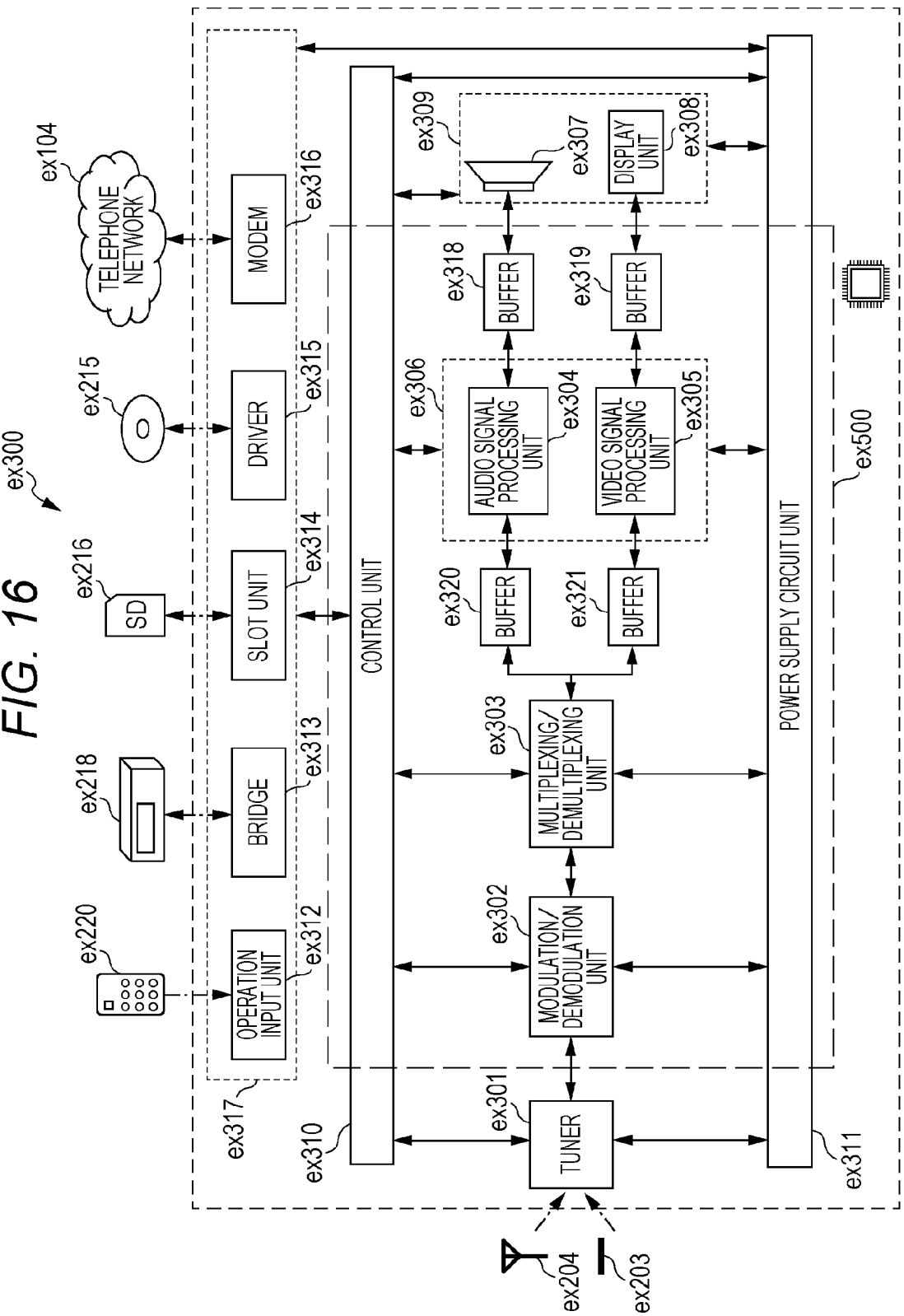
FIG. 16 is a block diagram illustrating an example of a configuration of a television.

In addition to the example of content providing system ex100, at least one of the video coding apparatus (image coding apparatus) and the video decoding apparatus (image decoding apparatus) according to each of the above-described exemplary embodiments can be incorporated in digital broadcasting system ex200 as illustrated in FIG. 16. Specifically, broadcasting station ex201 transmits a radio wave of multiplexed data obtained by multiplexing video data, music data, and the like, via communication to broadcasting satellite ex202. This video data is data coded using the video coding method described in each of the above-described exemplary embodiments (that is, data coded by the image coding apparatus according to one aspect of the present disclosure). Upon receipt of this data, broadcasting satellite ex202 transmits a broadcasting radio wave, and home antenna ex204 capable of receiving satellite broadcasting receives this radio wave. An apparatus such as television (receiver) ex300 or set top box (STB) ex217 decodes and reproduces the received multiplexed data (that is, the apparatus functions as the image decoding apparatus according to one aspect of the present disclosure).

Also, the video decoding apparatus or the video coding apparatus described in each of the above-described exemplary embodiments can be implemented in reader/recorder ex218 that reads and decodes the multiplexed data recorded on recording medium ex215 such as a DVD (Digital Versatile Disc) or a BD (Blu-ray Disc); or that codes a video signal and further multiplexes a music signal with the video signal depending on circumstances, and writes the resulting signal on recording medium ex215. In this case, the reproduced video signal is displayed on monitor ex219, and the video signal can be reproduced by another apparatus or system using recording medium ex215 having the multiplexed data recorded thereon. Alternatively, the video decoding apparatus may be implemented in set top box ex217 connected to cable ex203 for cable television or home antenna ex204 for satellite/terrestrial broadcasting, and the video signal may be displayed on monitor ex219 of television ex300. At this time, the video decoding apparatus may be incorporated into television ex300 instead of set top box ex217.

Figure 17:
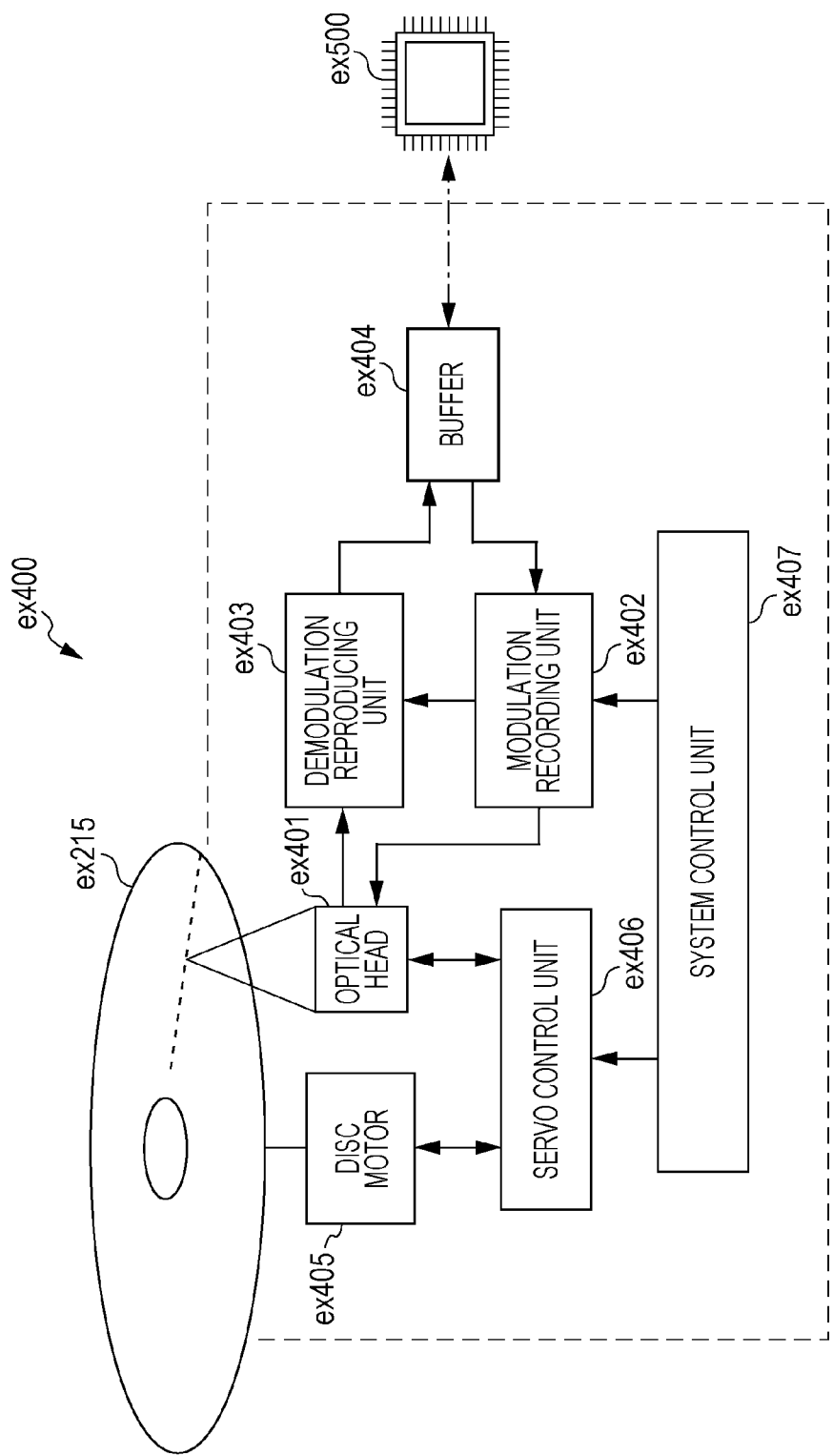
FIG. 17 is a block diagram illustrating an example of a configuration of an information reproducing/recording unit that reads information from and writes information to a recording medium that is an optical disc.

FIG. 17 is a diagram illustrating television (receiver) ex300 that employs the video decoding method and the video coding method described in each of the exemplary embodiments above. Television ex300 includes tuner ex301 that obtains or outputs, via antenna ex204 or cable ex203 that receives broadcasting, multiplexed data in which video data and audio data are multiplexed together; modulation/demodulation unit ex302 that performs demodulation on the received multiplexed data or modulation on multiplexed data to be transmitted to outside; and multiplexing/demultiplexing unit ex303 that demultiplexes the demodulated multiplexed data into video data and audio data, or multiplexes video data and audio data that have been coded by signal processing unit ex306.

Television ex300 also includes signal processing unit ex306 and output unit ex309. Signal processing unit ex306 includes audio signal processing unit ex304 that decodes or codes audio data, and video signal processing unit ex305 that decodes or codes video data (video signal processing unit ex305 functions as the image coding apparatus or the image decoding apparatus according to one aspect of the present disclosure). Output unit ex309 includes speaker ex307 that outputs the decoded audio signal, and display unit ex308, such as a display, that displays the decoded video signal. Television ex300 further includes interface unit ex317 which includes operation input unit ex312 that accepts input of a user operation. Television ex300 further includes control unit ex310 that controls the individual units in an integrated manner, and power supply circuit unit ex311 that supplies electric power to the individual units. Interface unit ex317 may include bridge ex313 to be connected to an external device, such as reader/recorder ex218; slot unit ex314 that enables connection of recording medium ex216 such as an SD card; driver ex315 for connection to external recording medium ex215, such as a hard disk; and modem ex316 for connection to telephone network ex104 as well as operation input unit ex312. Note that recording medium ex216 is capable of electrically storing information by using a nonvolatile/volatile semiconductor memory included therein. The individual units of television ex300 are connected to one another via a synchronization bus.

First, a configuration that allows television ex300 to decode and reproduce multiplexed data obtained from outside with antenna ex204 or the like will be described. Television ex300 receives a user operation from remote control ex220 or the like. Based on control performed by control unit ex310 including a CPU or the like, multiplexing/demultiplexing unit ex303 demultiplexes multiplexed data that has been demodulated by modulation/demodulation unit ex302. Further, in television ex300, audio signal processing unit ex304 decodes the separated audio data and video signal processing unit ex305 decodes the separated video data by using the image decoding method described in each of the above exemplary embodiments. Further, the decoded audio signal and video signal are output to outside from output unit ex309. When the audio signal and the video signal are output, these signals may be temporarily stored in buffers ex318 and ex319 or the like so that they are reproduced in synchronization with each other. Also, television ex300 may read multiplexed data from recording media ex215 and ex216 such as a magnetic/optical disc and an SD card as well as from broadcasting. Next, a configuration that allows television ex300 to code an audio signal and a video signal and to transmit the resulting signals to outside or write the resulting signals on a recording medium or the like will be described. Television ex300 receives a user operation from remote control ex220 or the like. Based on control performed by control unit ex310, audio signal processing unit ex304 codes the audio signal, and video signal processing unit ex305 codes the video signal by using the image coding method described in each of the above exemplary embodiments. The coded audio signal and video signal are multiplexed by multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as buffers ex318, ex319, ex320, and ex321; or one or more buffers may be shared. Further, in addition to the illustrated buffers, for example, data may be stored in a buffer that serves as a buffering member for avoiding an overflow or underflow in the system between modulation/demodulation unit ex302 and multiplexing/demultiplexing unit ex303 or the like.

Television ex300 may also include a configuration for receiving audio/video input of a microphone or a camera in addition to the configuration for obtaining audio data and video data from broadcasting, a recording medium, or the like; and may perform the coding process on the data obtained therefrom. Although television ex300 has been described as the configuration capable of performing the above-described coding process, multiplexing, and outputting to outside, television ex300 may be a configuration incapable of performing these processes and only capable of the reception, decoding process, and outputting to outside.

In the case where multiplexed data is read from and written to a recording medium by reader/recorder ex218, the decoding process or the coding process may be performed by television ex300, by reader/recorder ex218, or by both television ex300 and reader/recorder ex218 on a processing-sharing basis.

Figure 18:
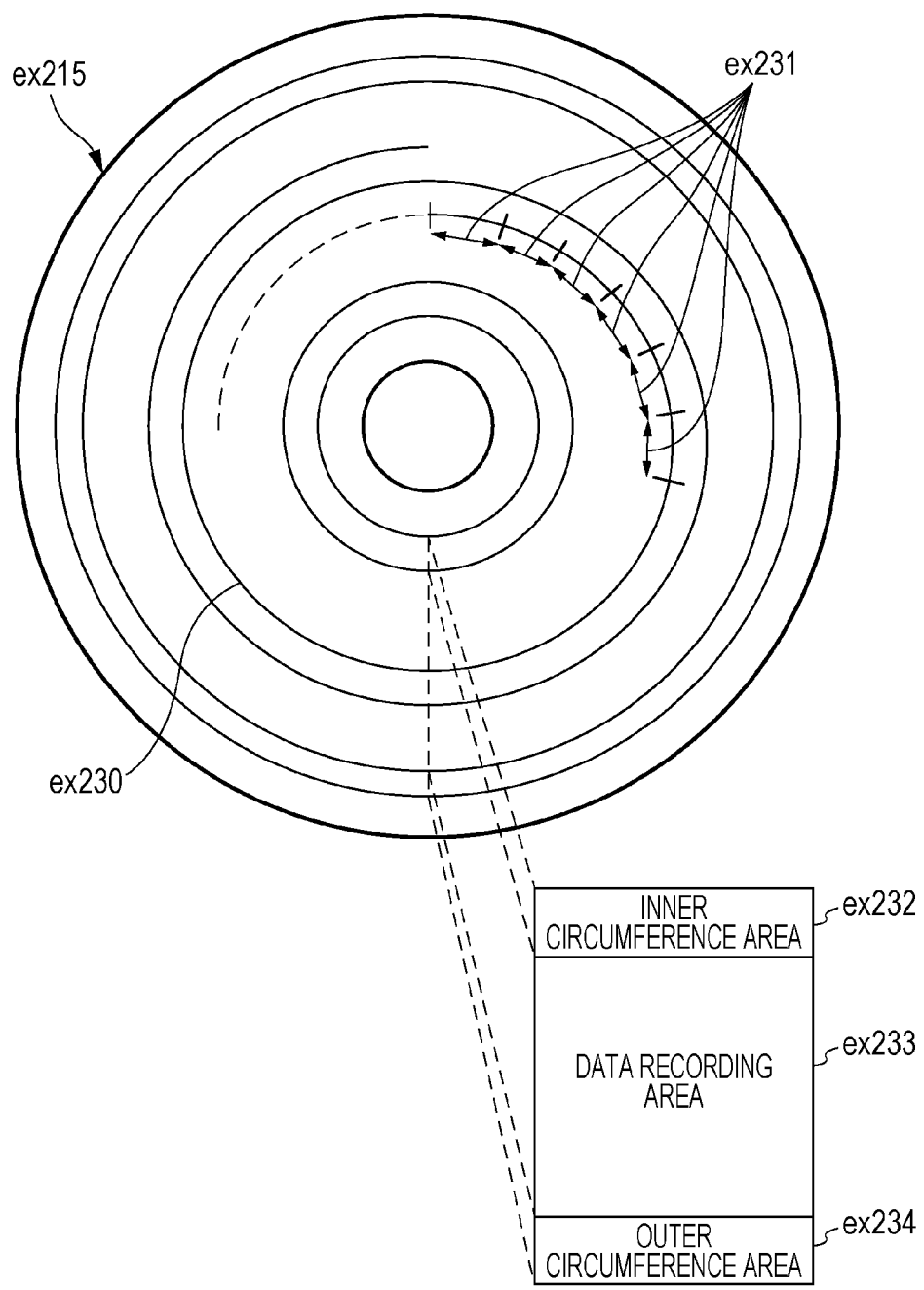
FIG. 18 is a diagram illustrating an example of a structure of an optical disc recording medium.

FIG. 18 illustrates an example of a configuration of information reproducing/recording unit ex400 in the case of reading data from and writing data to an optical disc. Information reproducing/recording unit ex400 includes optical head ex401, modulation recording unit ex402, demodulation reproducing unit ex403, buffer ex404, disc motor ex405, survo control unit ex406, and system control unit ex407. Optical head ex401 irradiates a recording surface of recording medium ex215, which is an optical disc, with a laser spot to write information thereon; and detects reflected light from the recording surface of recording medium ex215 to read information. Modulation recording unit ex402 electrically drives a semiconductor laser included in optical head ex401 to modulate a laser beam in accordance with to-be-recorded data. Demodulation reproducing unit ex403 amplifies a reproduced signal which is obtained by electrically detecting reflected light from the recording surface by a photodetector included in optical head ex401, separates and demodulates signal components recorded on recording medium ex215, and reproduces necessary information. Buffer ex404 temporarily stores information to be recorded on recording medium ex215 and information reproduced from recording medium ex215. Disc motor ex405 rotates recording medium ex215. Survo control unit ex406 moves optical head ex401 to a certain information track while controlling rotational driving of disc motor ex405 to perform a laser spot tracking process. System control unit ex407 controls information reproducing/recording unit ex400. The above-described reading and writing processes are implemented as a result of system control unit ex407 performing recording/reproduction of information via optical head ex401 while causing modulation recording unit ex402, demodulation reproducing unit ex403, and survo control unit ex406 to operate in cooperation with one another and using various pieces of information held in buffer ex404 and generating/adding new information as needed. System control unit ex407 includes, for example, a microprocessor and performs these processes by executing a read/write program.

Although optical head ex401 that irradiates the recording surface with a laser spot has been described above, optical head ex401 may include a configuration for performing high-density recording using near field light.

Figure 19A:
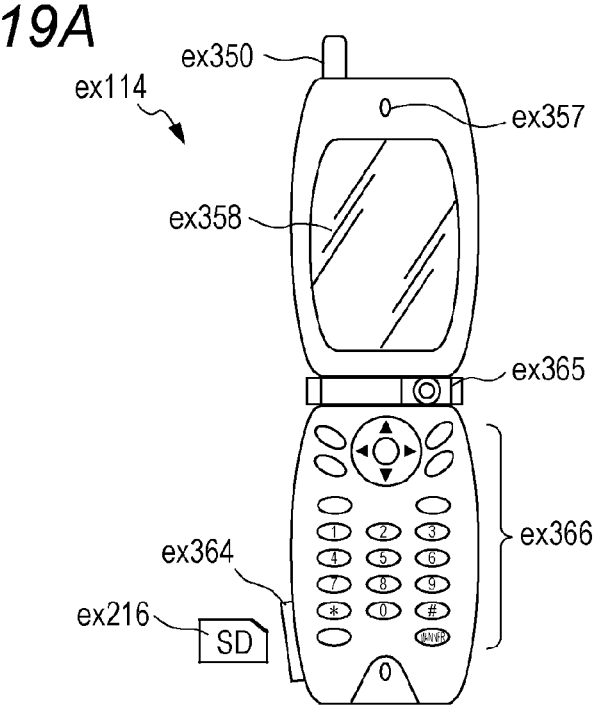
FIG. 19A is a diagram illustrating an example of a mobile phone.
Figure 19B:
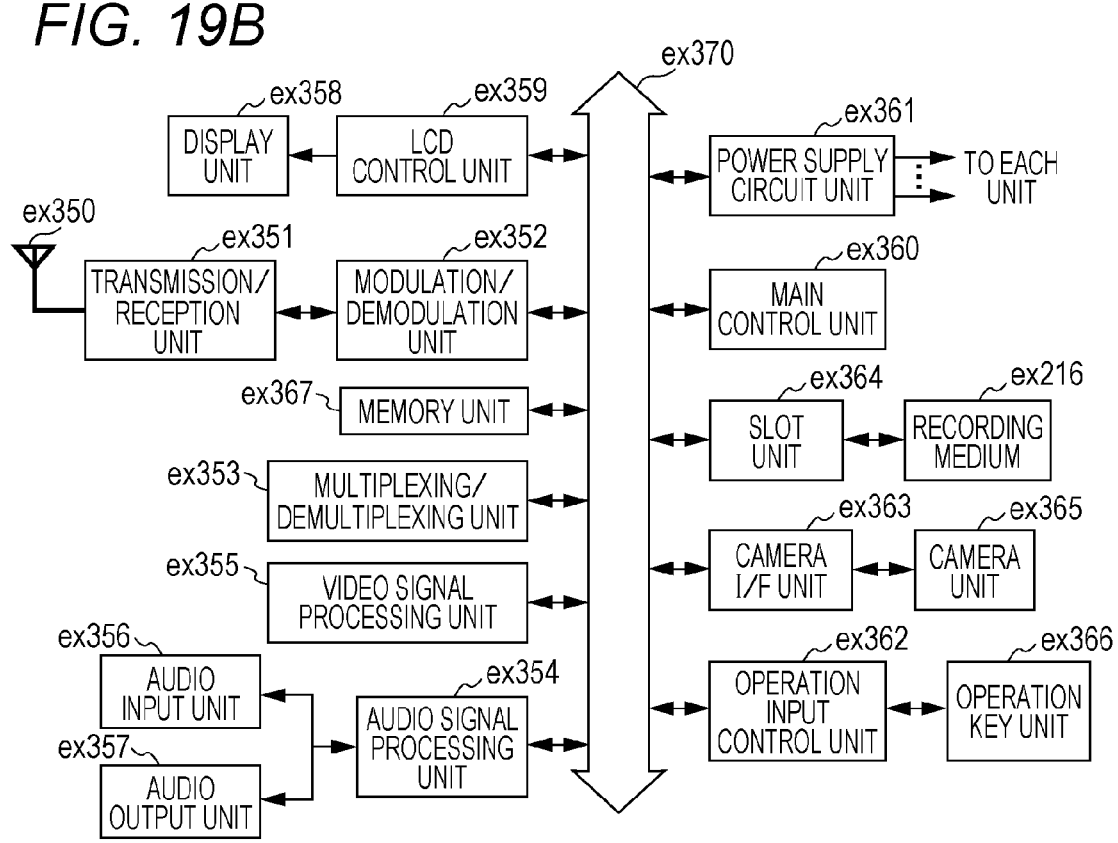
FIG. 19B is a block diagram illustrating an example of a configuration of the mobile phone.

FIG. 19 is a schematic diagram of recording medium ex215 which is an optical disc. On the recording surface of recording medium ex215, a guide groove (groove) is spirally formed. In information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing information track ex230 and reading the address information. Also, recording medium ex215 includes data recording area ex233, inner circumference area ex232, and outer circumference area ex234. Data recording area ex233 is an area used for recording user data. Inner circumference area ex232 and outer circumference area ex234 that are located on the inner side and the outer side of data recording area ex233, respectively, are used for purposes other than recording of user data. Information reproducing/recording unit ex400 performs reading/writing of coded audio data, coded video data, or multiplexed data of these pieces of data on data recording area ex233 of recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in digital broadcasting system ex200, data may be received by vehicle ex210 equipped with antenna ex205 from broadcasting satellite ex202 or the like and a moving image may be reproduced on a display device of car navigation system ex211 mounted on vehicle ex210. Note that the configuration illustrated in FIG. 17 additionally including a GPS reception unit is conceivable as the configuration of car navigation system ex211, and the same applies to computer ex111, mobile phone ex114, or the like.

FIG. 20A is a diagram illustrating mobile phone ex114 that employs the video decoding method and the video coding method described in the above exemplary embodiments. Mobile phone ex114 includes antenna ex350 that transmits and receives a radio wave to and from base station ex110; camera unit ex365 capable of capturing video and still images; and display unit ex358, such as a liquid crystal display, that displays the video captured by camera unit ex365 and data obtained by decoding video or the like received with antenna ex350. Mobile phone ex114 further includes a body including operation key unit ex366; audio output unit ex357 such as a speaker for outputting audio; audio input unit ex356 such as a microphone for inputting audio; memory unit ex367 that stores coded data or decoded data of captured video, captured still images, recorded audio, received video, received still images, or received emails; and slot unit ex364 which is an interface to a recording medium which similarly stores data thereon.

Further, an example of a configuration of mobile phone ex114 will be described with reference to FIG. 20B. Mobile phone ex114 includes main control unit ex360 that controls individual units of the body which includes display unit ex358 and operation key unit ex366 in an integrated manner. Mobile phone ex114 also includes power supply circuit unit ex361, operation input control unit ex362, video signal processing unit ex355, camera interface unit ex363, LCD (Liquid Crystal Display) control unit ex359, modulation/demodulation unit ex352, multiplexing/demultiplexing unit ex353, audio signal processing unit ex354, slot unit ex364, and memory unit ex367 which are connected to main control unit ex360 via bus ex370.

When an on-hook/power key is turned on through a user operation, power supply circuit unit ex361 supplies electric power to individual units from a battery pack to activate mobile phone ex114 into an operable state.

In mobile phone ex114, in a voice call mode, audio signal processing unit ex354 converts an audio signal obtained by audio input unit ex356 into a digital audio signal, modulation/demodulation unit ex352 performs spread spectrum processing on this digital audio signal, and transmission/reception unit ex351 performs digital-to-analog conversion processing and frequency conversion processing on this signal and then transmits the resulting signal via antenna ex350 in accordance with control performed by main control unit ex360 which includes a CPU, a ROM, and a RAM. Also, in mobile phone ex114, in the voice call mode, transmission/reception unit ex351 amplifies reception data received via antenna ex350 and performs frequency conversion processing and analog-to-digital conversion processing, modulation/demodulation unit ex352 performs spread spectrum processing on the resulting signal, audio signal processing unit ex354 converts the resulting signal into an analog audio signal. The analog audio signal is then output from audio output unit ex357.

In the case where an email is transmitted in a data communication mode, text data of the email input through operation of operation key unit ex366 of the body or the like is sent to main control unit ex360 via operation input control unit ex362. Main control unit ex360 performs control such that modulation/demodulation unit ex352 performs spread spectrum processing on the text data and transmission/reception unit ex351 performs digital-to-analog conversion processing and frequency conversion processing on the text data and then transmits the resulting text data to base station ex110 via antenna ex350. In the case of receiving an email, substantially the opposite processing is performed on the received data, and the resulting text data is output to display unit ex358.

In the case where video, a still image, or a combination of video and audio are transmitted in the data communication mode, video signal processing unit ex355 compresses and codes a video signal supplied from camera unit ex365 by using the video coding method described in each of the above exemplary embodiments (that is, video signal processing unit ex355 functions as the image coding apparatus according to one aspect of the present disclosure), and sends the coded video data to multiplexing/demultiplexing unit ex353. Also, audio signal processing unit ex354 codes an audio signal obtained by audio input unit ex356 while the video, still image, or the like is being captured by camera unit ex365, and sends the coded audio data to multiplexing/demultiplexing unit ex353.

Multiplexing/demultiplexing unit ex353 multiplexes the coded video data supplied from video signal processing unit ex355 and the coded audio data supplied from audio signal processing unit ex354 in accordance with a certain scheme. Modulation/demodulation unit (modulation/demodulation circuit unit) ex352 performs spread spectrum processing on the resulting multiplexed data. Transmission/reception unit ex351 performs digital-to-analog conversion processing and frequency conversion processing on the multiplexed data, and then transmits the resulting data via antenna ex350.

In the case of receiving data of a moving image file linked to a web site or the like or an email attached with video or audio in the data communication mode, multiplexing/demultiplexing unit ex353 demultiplexes multiplexed data into a bitstream of video data and a bitstream of audio data in order to decode the multiplexed data received via antenna ex350. Multiplexing/demultiplexing unit ex353 supplies the coded video data to video signal processing unit ex355 and the coded audio data to audio signal processing unit ex354 via synchronization bus ex370. Video signal processing unit ex355 performs decoding using a video decoding method corresponding to the video coding method described in each of the above exemplary embodiments to decode the video signal (that is, video signal processing unit ex355 functions as the image decoding apparatus according to one aspect of the present disclosure). Then, for example, video or still image included in the moving image file linked to the website is displayed on display unit ex358 via LCD control unit ex359. Also, audio signal processing unit ex354 decodes the audio signal, and the resulting audio is output by audio output unit ex357.

Like television ex300, three implementation forms, that is, a transmission/reception terminal including both an encoder and a decoder, a transmission terminal only including an encoder, and a reception terminal only including a decoder, are conceivable for a terminal such as mobile phone ex114. Further, the case has been described in which multiplexed data in which video data, audio data, and so forth are multiplexed is received and transmitted in digital broadcasting system ex200; however, the multiplexed data may be data in which text data related to the video is multiplexed other than audio data or video data alone may be used instead of the multiplexed data.

As described above, the video coding method or the video decoding method described in each of the above exemplary embodiments is applicable to any of the aforementioned devices and systems. In such a way, advantages described in each of the above exemplary embodiments can be obtained.

Also, the present disclosure is not limited to the exemplary embodiments above, and various modifications and corrections can be made without departing from the scope of the present disclosure.

Fourth Exemplary Embodiment

Video data can also be generated by switching between the video coding method or apparatus described in each of the above exemplary embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above exemplary embodiments will be described below. Multiplexed data is a digital stream in the MPEG-2 transport stream formant.

Figure 21:
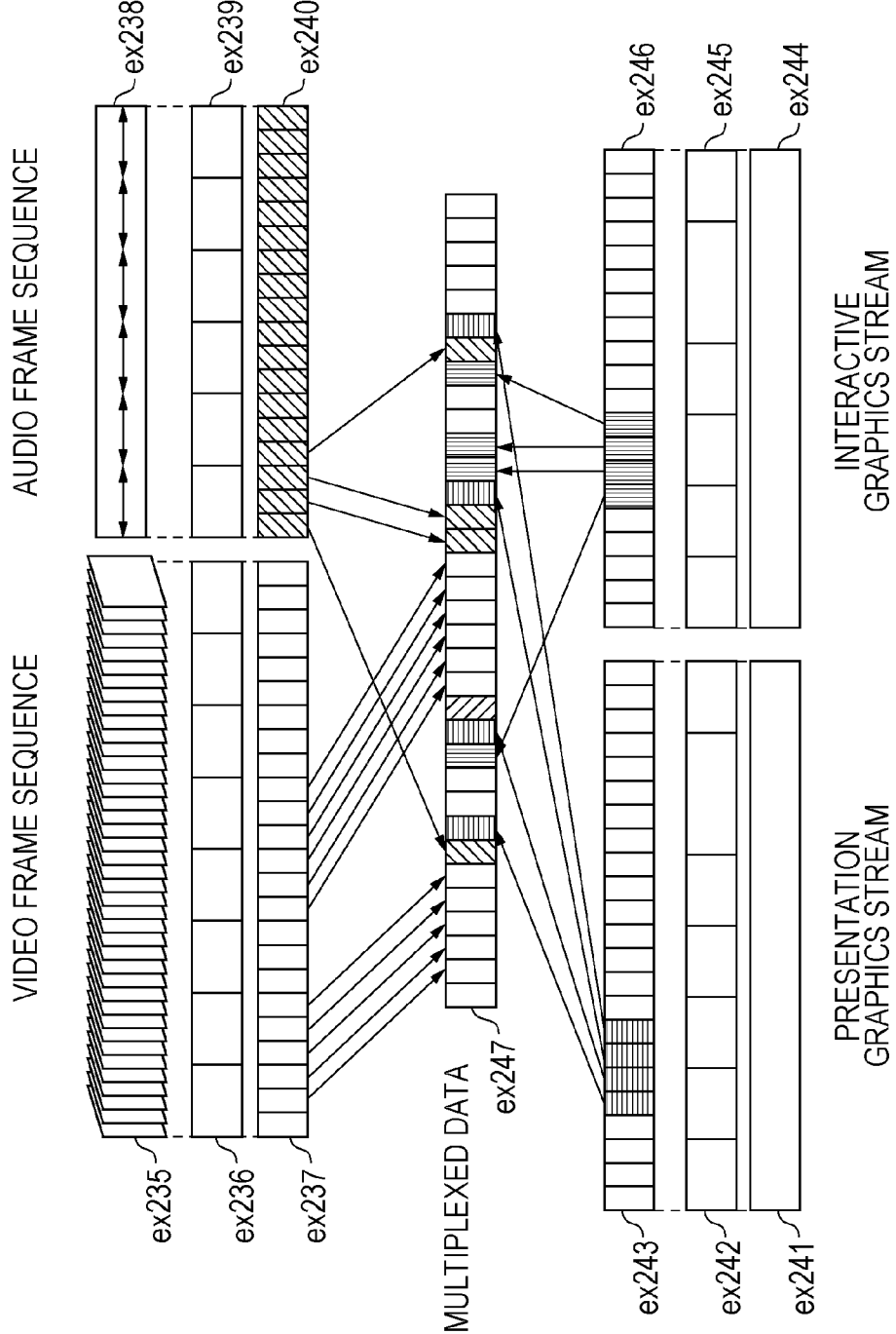
FIG. 21 is a diagram schematically illustrating how individual streams are multiplexed into multiplexed data.

FIG. 21 is a diagram illustrating a structure of multiplexed data. As illustrated in FIG. 21, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above exemplary embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier). For example, 0x1011 is assigned to a video stream to be used as video of a movie. Any one of 0x1100 to 0x111F is assigned to an audio stream. Any one of 0x1200 to 0x121F is assigned to a presentation graphics stream. Any one of 0x1400 to 0x141F is assigned to an interactive graphics stream. Any one of 0x1B00 to 0x1B1F is assigned to a video stream to be used as sub video of the movie. Any one of 0x1A00 to 0x1A1F is assigned to an audio stream to be used as sub audio to be mixed with main audio.

Figure 22:
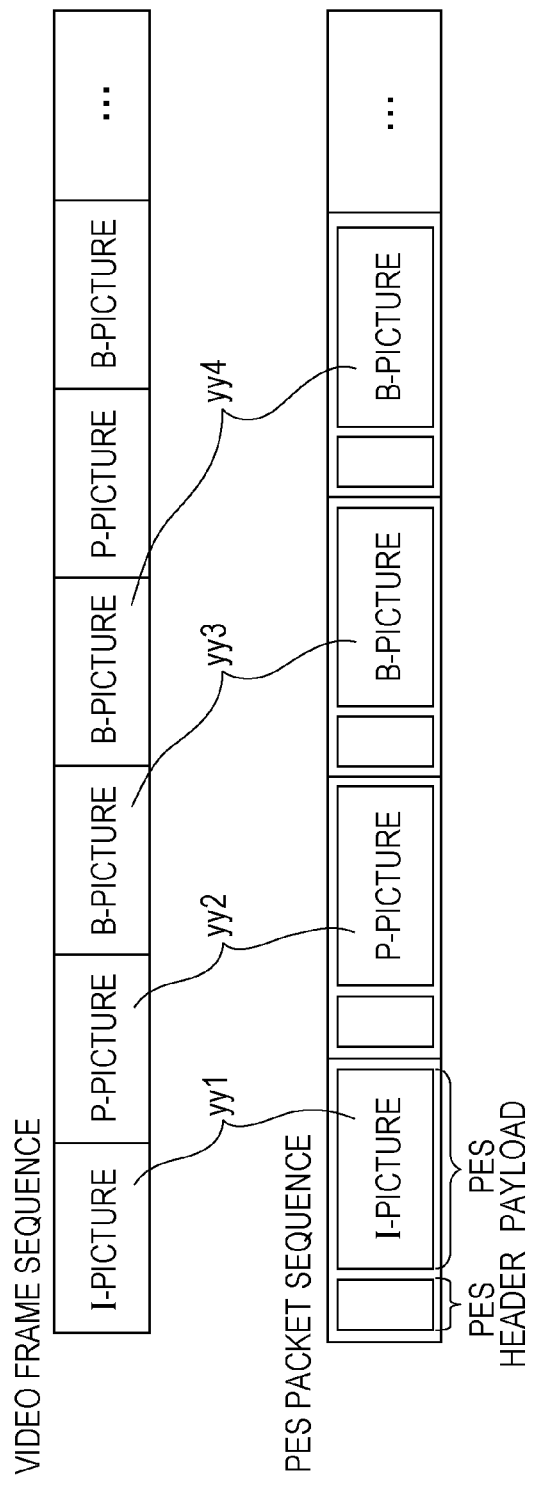
FIG. 22 is a diagram illustrating how a video stream is stored in a packetized elementary stream (PES) packet sequence in a more detailed manner.

FIG. 22 is a diagram schematically illustrating how individual streams are multiplexed into multiplexed data. Video stream ex235 made up of a plurality of video frames and audio stream ex238 made up of a plurality of audio frames are converted into PES (Packetized Elementary Stream) packet sequences ex236 and ex239, and then into TS (Transport Stream) packets ex237 and ex240, respectively. Likewise, data of presentation graphics stream ex241 and data of interactive graphics stream ex244 are converted into PES packet sequences ex242 and ex245, and further into TS packets ex243 and ex246, respectively. Multiplexed data ex247 is formed by multiplexing these TS packets into one stream.

FIG. 23 illustrates how a video stream is stored in a PES packet sequence in detail. The upper row in FIG. 23 illustrates a video frame sequence of the video stream. The lower row illustrates a PES packet sequence. As denoted by arrows yy1, yy2, yy3, and yy4 in FIG. 23, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

Figure 24:
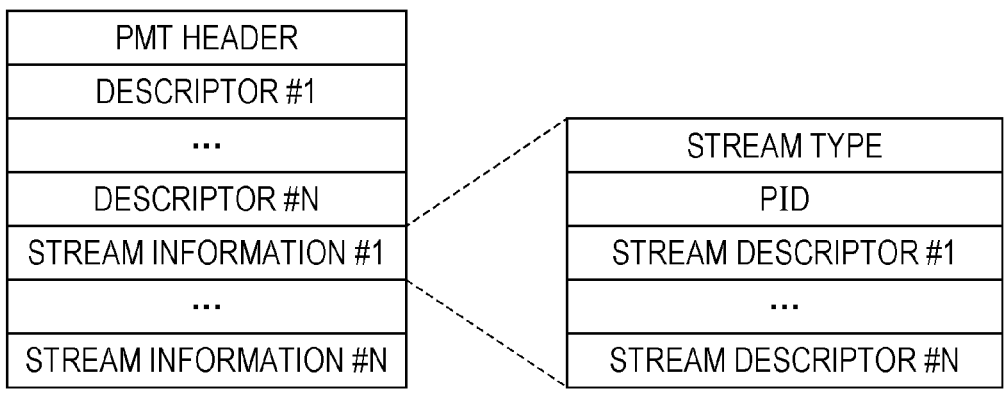
FIG. 24 is a diagram illustrating a data structure of a program map table (PMT)

FIG. 24 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 24, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 25:
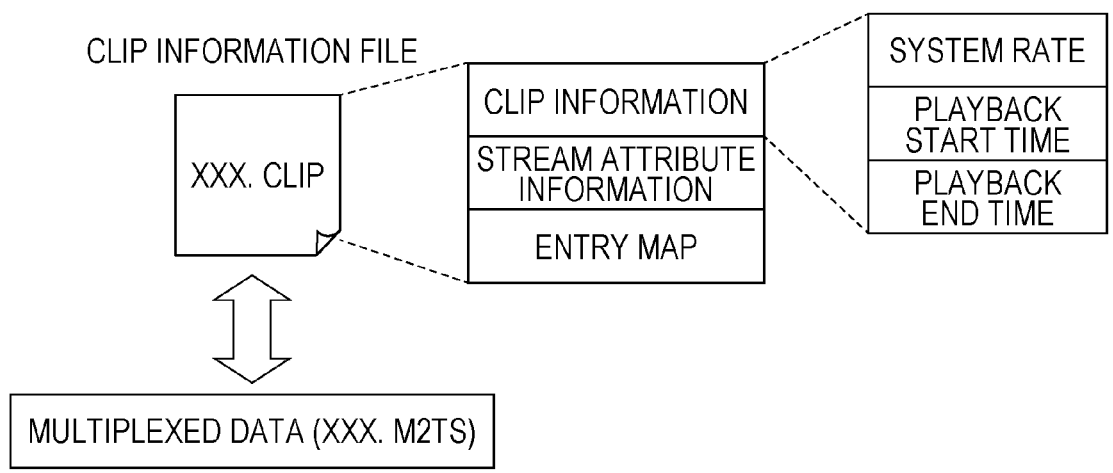
FIG. 25 is a diagram illustrating an internal structure of multiplexed data information.

FIG. 25 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 26:
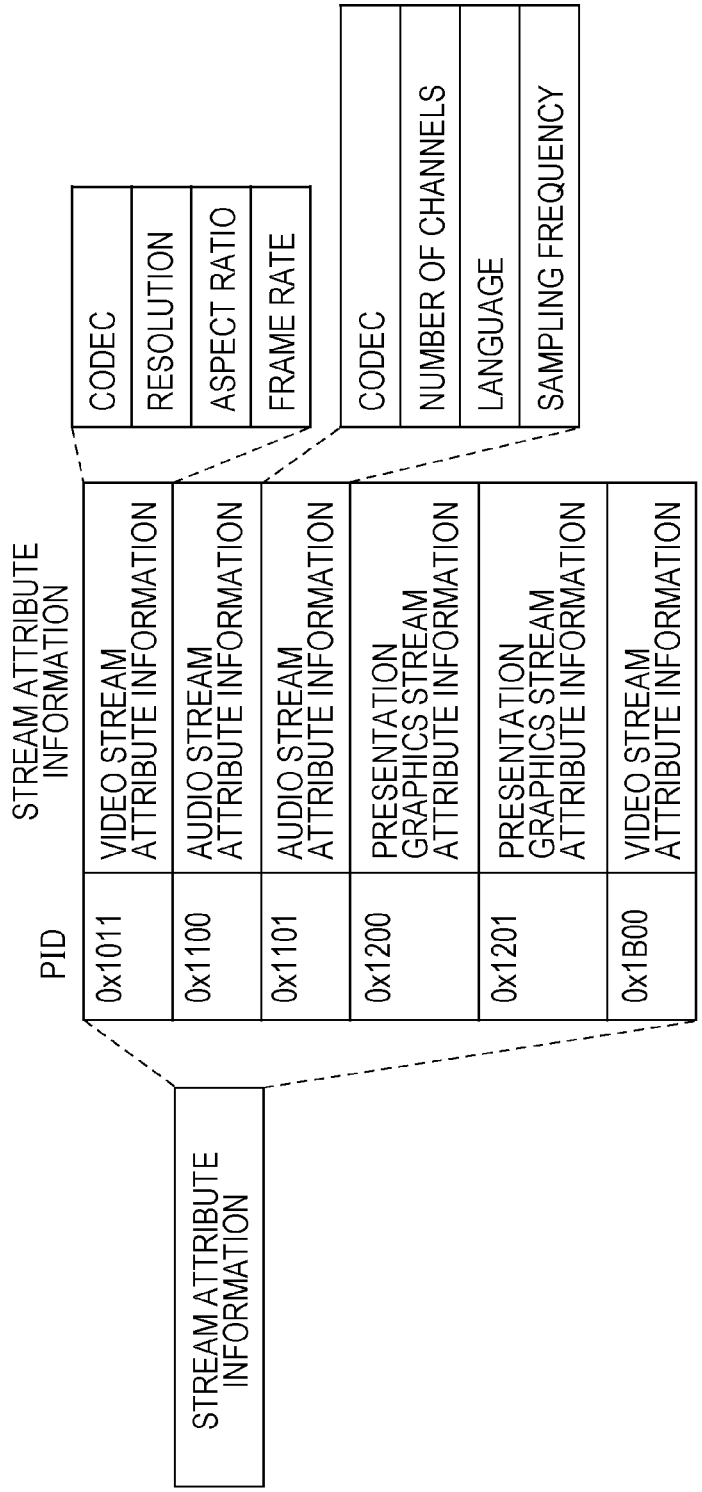
FIG. 26 is a diagram illustrating an internal structure of stream attribute information.

As illustrated in FIG. 26, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 26. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 27:
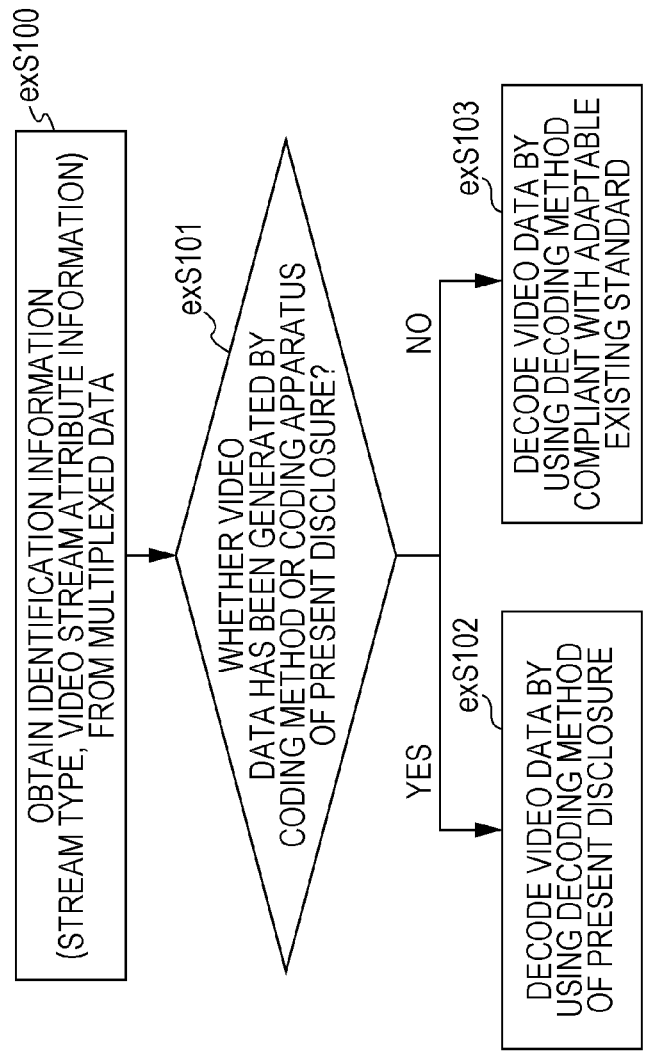
FIG. 27 is a diagram illustrating steps for identifying video data.

For each PID, attribute information of a corresponding stream included in the multiplexed data is registered in the stream attribute information as illustrated in FIG. 27. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the fourth exemplary embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above exemplary embodiments includes a step or unit for setting unique information which indicates whether or not this video data has been generated by the video coding method or apparatus described in each of the above exemplary embodiments, in the stream type contained in the PMT or the video stream attribute information. With this configuration, video data generated using the video coding method or apparatus described in each of the above exemplary embodiments and video data based on another standard can be distinguished from each other.

Figure 28:
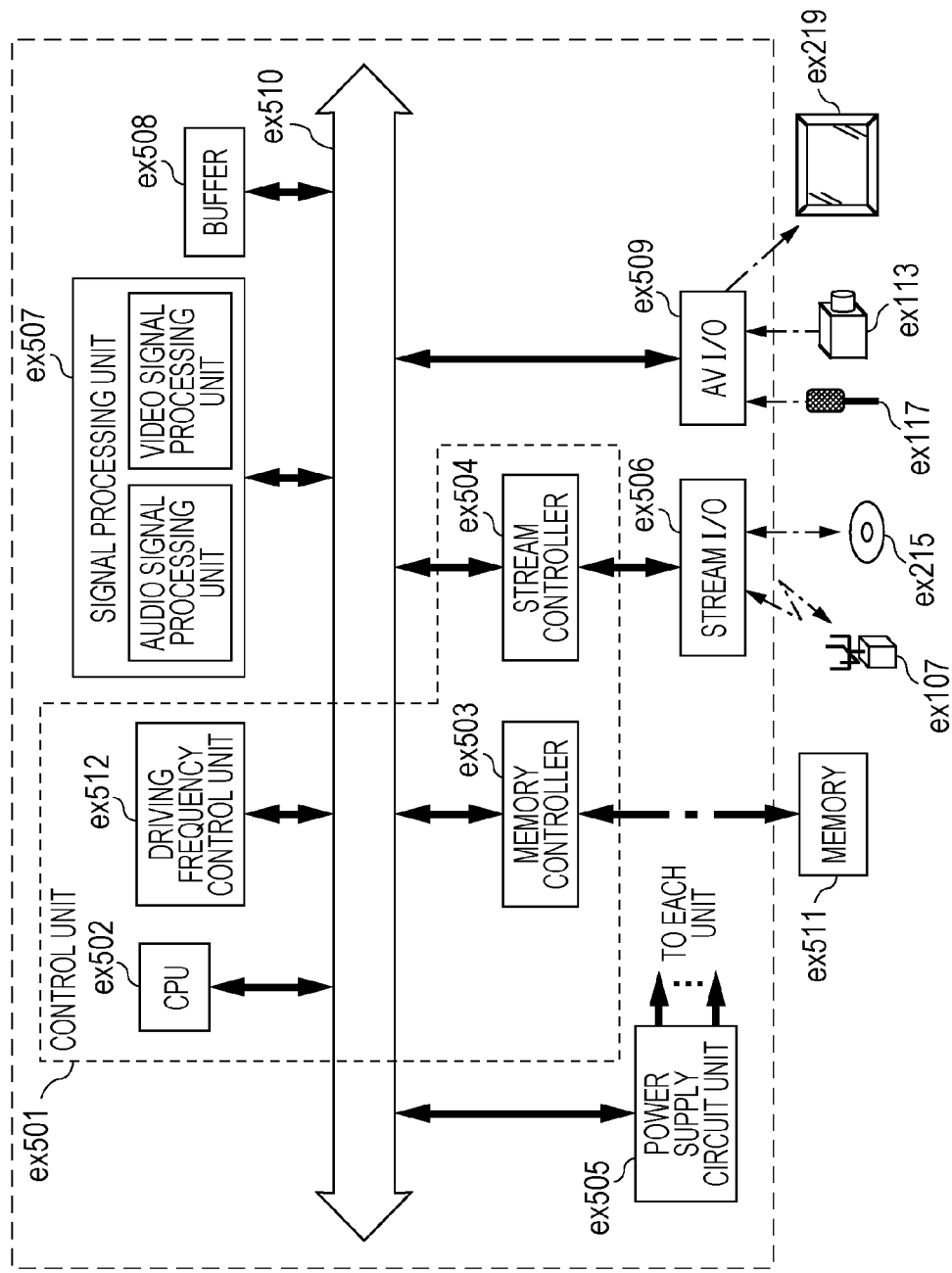
FIG. 28 is a block diagram illustrating an example of a configuration of an integrated circuit that implements a video coding method and a video decoding method according to each of the exemplary embodiments.

FIG. 28 illustrates steps included in a video decoding method in accordance with the fourth exemplary embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above exemplary embodiments. If it is determined from the stream type or the video stream attribute information that this multiplexed data has been generated using the video coding method or apparatus described in each of the above exemplary embodiments, decoding is performed using the video decoding method described in each of the above exemplary embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the fourth exemplary embodiment is applicable to any of the aforementioned devices and systems.

Fifth Exemplary Embodiment

Figure 29:
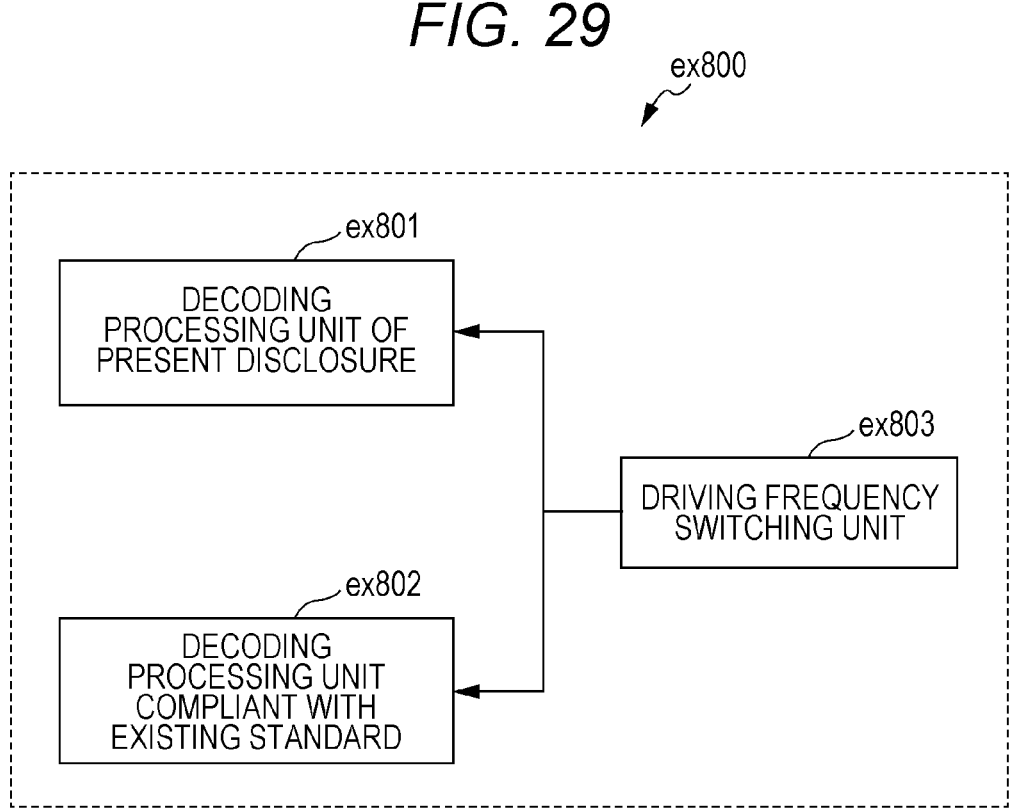
FIG. 29 is a diagram illustrating a configuration for switching between driving frequencies.

The video coding method and apparatus and the video decoding method and apparatus described in each of the above exemplary embodiments are typically implemented using an LSI which is an integrated circuit. FIG. 29 illustrates an example of a configuration of LSI ex500 which is formed as one chip. LSI ex500 includes control unit ex501, CPU ex502, memory controller ex503, stream controller ex504, power supply circuit unit ex505, stream input/output (I/O) ex506, signal processing unit ex507, buffer ex508, and audio/video (AV) I/O ex509, which are connected to one another via bus ex510. Upon power-on, power supply circuit unit ex505 supplies electric power to the individual units to activate the individual units into an operable state.

For example, in the case of performing a coding process, LSI ex500 receives an AV signal from microphone ex117, camera ex113, or the like via AV I/O ex509 in accordance with control performed by control unit ex501 which includes CPU ex502, memory controller ex503, stream controller ex504, and driving frequency control unit ex512. The input AV signal is temporarily stored in external memory ex511, such as an SDRAM (Synchronous Dynamic Random Access Memory). In accordance with control performed by control unit ex501, the stored data is divided into a plurality of portions in accordance with an amount of processing or a processing speed, and the plurality of portions are sent to signal processing unit ex507. Then, signal processing unit ex507 codes the audio signal and/or the video signal. The coding process performed on the video signal here is the coding process described in each of the above exemplary embodiments. Signal processing unit ex507 performs processing such as multiplexing of the coded audio data and the coded video data depending on circumstances, and outputs the multiplexed data to outside via stream I/O ex506. This output multiplexed data is transmitted to base station ex107 or written to recording medium ex215. Note that the audio data and the video data may be temporarily stored in buffer ex508 at the time of multiplexing so that these pieces of data are synchronized with each other.

Note that although memory ex511 has been described as a device provided outside LSI ex500 above, memory ex511 may be included in LSI ex500. The number of buffers ex508 is not limited to one and LSI ex500 may include a plurality of buffers. Also, LSI ex500 may be formed as a single chip or a plurality of chips.

Although control unit ex501 includes CPU ex502, memory controller ex503, stream controller ex504, and driving frequency control unit ex512 above, the configuration of control unit ex501 is not limited to this one. For example, signal processing unit ex507 may further include a CPU. By providing a CPU within signal processing unit ex507, the processing speed can be further improved. Alternatively, CPU ex502 may include signal processing unit ex507 or, for example, an audio signal processing unit which is part of signal processing unit ex507. In such a case, control unit ex501 includes CPU ex502 which includes signal processing unit ex507 or part of signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used. Such a programmable logic device can execute the video coding method or the video decoding method described in each of the above exemplary embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Sixth Exemplary Embodiment

It is considered that an amount of processing increases in the case of decoding video data generated using the video coding method or apparatus described in each of the above exemplary embodiments, compared with the case of decoding video data based on an existing standard, such as MPEG-2, MPEG-4 AVC, or VC-1. Accordingly, in LSI ex500, a higher driving frequency needs to be set in CPU ex502 than that used when video data based on an existing standard is decoded. However, making the driving frequency higher undesirably increases power consumption.

Figure 30:
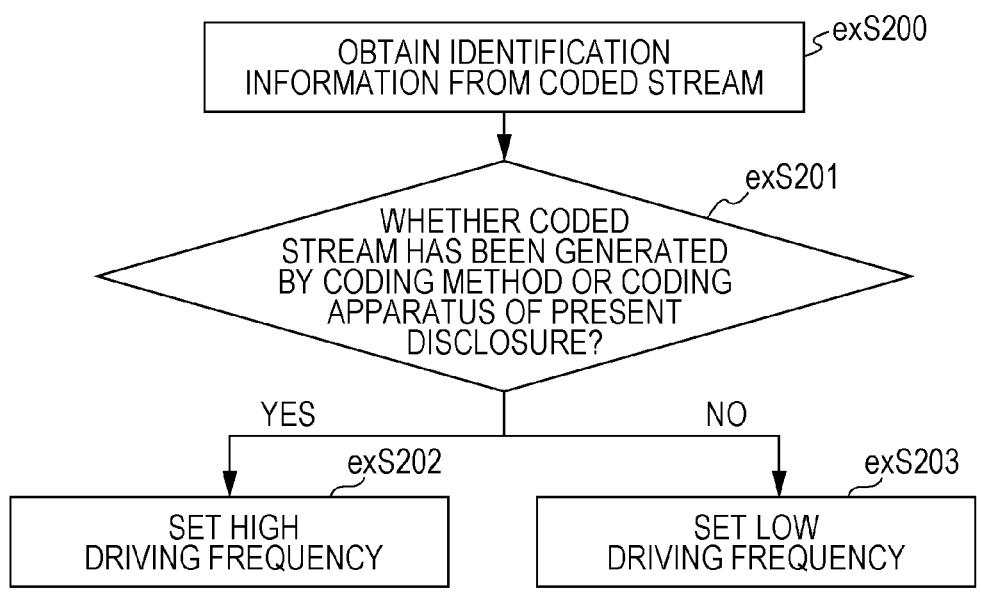
FIG. 30 is a diagram illustrating steps for identifying video data and for switching between driving frequencies.

To address this issue, the video decoding apparatus, such as television ex300 or LSI ex500, is configured to identify a standard which video data is based on, and to switch between the driving frequencies in accordance with the standard. FIG. 30 illustrates configuration ex800 in accordance with the sixth exemplary embodiment. Driving frequency switching unit ex803 sets the driving frequency high in the case where video data is data that has been generated using the video coding method or apparatus described in each of the above exemplary embodiments. Driving frequency switching unit ex803 also instructs decoding processing unit ex801 which executes the video decoding method described in each of the above exemplary embodiments to decode the video data. On the other hand, in the case where the video data is data based on an existing standard, driving frequency switching unit ex803 sets the driving frequency lower than that of the case where the video data is data that has been generated using the video coding method or apparatus described in each of the above exemplary embodiments. Then, driving frequency switching unit ex803 instructs decoding processing unit ex802 compliant with the existing standard to decode the video data.

More specifically, driving frequency switching unit ex803 includes CPU ex502 and driving frequency control unit ex512 illustrated in FIG. 29. Decoding processing unit ex801 that executes the video decoding method described in each of the above exemplary embodiments and decoding processing unit ex802 compliant with an existing standard correspond to signal processing unit ex507 illustrated in FIG. 29. CPU ex502 identifies a standard which video data is based on. Then, based on a signal from CPU ex502, driving frequency control unit ex512 sets the driving frequency. Also, based on a signal from CPU ex502, signal processing unit ex507 decodes the video data. Here, the use of the identification information described in the exemplary embodiment B, for example, in identification of the video data is conceivable. The identification information is not limited to the one described in the exemplary embodiment B and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of CPU ex502 in accordance with a lookup table in which the standard for the video data and the driving frequency are associated with each other as illustrated in FIG. 32, for example. The lookup table is stored in buffer ex508 or an internal memory of LSI ex500, and CPU ex502 refers to this lookup table. In this way, the driving frequency can be selected.

FIG. 31 illustrates steps for performing the method according to the sixth exemplary embodiment. First, in step exS200, signal processing unit ex507 obtains identification information from multiplexed data. Then, in step exS201, based on the identification information, CPU ex502 identifies whether or not video data is video data that has been generated using the video coding method or apparatus described in each of the above exemplary embodiments. If the video data is video data that has been generated using the video coding method or apparatus described in each of the above exemplary embodiments, CPU ex502 sends a signal for setting a high driving frequency to driving frequency control unit ex512 in step exS202. Then, driving frequency control unit ex512 sets a high driving frequency. On the other hand, if the identification information indicates that the video data is video data based on an existing standard, such as MPEG-2, MPEG-4 AVC, or VC-1, CPU ex502 sends a signal for setting a low driving frequency to driving frequency control unit ex512 in step exS203. Then, driving frequency control unit ex512 sets a lower driving frequency than that used when the video data is video data that has been generated using the video coding method or apparatus described in each of the above exemplary embodiments.

Further, by changing a voltage supplied to LSI ex500 or an apparatus including LSI ex500 in conjunction with switching of the driving frequency, the power-saving effect can be further increased. For example, it is conceivable that in the case where a low driving frequency is set, a voltage supplied to LSI ex500 or an apparatus including LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above exemplary embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above exemplary embodiments, a voltage supplied to LSI ex500 or an apparatus including LSI ex500 may be set to be high. In the case where the identification information indicates that the video data is video data based on an existing standard, such as MPEG-2, MPEG-4 AVC, or VC-1, a voltage supplied to LSI ex500 or an apparatus including LSI ex500 may be set to be low. Alternatively, in another example, in the case where the identification information indicates that the video data is video data that has been generated using the video coding method or apparatus described in each of the above exemplary embodiments, driving of CPU ex502 is not stopped. In the case where the identification information indicates that the video data is video data based on an existing standard, such as MPEG-2, MPEG-4 AVC, or VC-1, driving of CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above exemplary embodiments, driving of CPU ex502 may be temporarily stopped. In this case, a period over which CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where LSI ex500 or an apparatus including LSI ex500 is driven with a battery, the battery can be made last longer as a result of power-saving.

Seventh Exemplary Embodiment

A plurality of pieces of video data based on different standards are sometimes input to the aforementioned devices and systems, such as television ex300 and mobile phone ex114. In order to enable decoding even in the case where a plurality of pieces of video data based on different standards are input, signal processing unit ex507 of LSI ex500 needs to support the plurality of standards. However, the use of the signal processing units ex507 for the respective standards undesirably makes the circuit scale of LSI ex500 larger and increases the cost.

To address this issue, a decoding processing unit that executes the video decoding method described in each of the above exemplary embodiments and a decoding processing unit compliant with an existing standard, such as MPEG-2, MPEG-4 AVC, or VC-1, share some of their components. FIG. 33A illustrates an example of this configuration ex900. For example, the video decoding method described in each of the above exemplary embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, a decoding processing unit ex902 compliant with the MPEG-4 AVC standard in used in common. For other processing contents that are not compliant with the MPEG-4 AVC standard and are unique to an aspect of the present disclosure, dedicated decoding processing unit ex901 may be used. In particular, an aspect of the present disclosure includes a feature in inverse quantization. Thus, for example, dedicated decoding processing unit ex901 may be used for inverse quantization and decoding processing unit ex902 may be used in common for any of or all of entropy decoding, deblocking filtering, and motion compensation. Alternatively, as for sharing of the decoding processing unit, a configuration may be used in which a decoding processing unit that executes the video decoding method described in each of the above exemplary embodiments is used for the common processing contents and a dedicated decoding processing unit is used for processing contents unique to the MPEG-4 AVC standard.

FIG. 33B illustrates another example ex1000 that implements sharing of part of processing. In this example, dedicated decoding processing unit ex1001 that handles processing contents unique to an aspect of the present disclosure, dedicated decoding processing unit ex1002 that handles processing contents unique to an existing standard, and shared decoding processing unit ex1003 that handles processing contents that are common to the video decoding method according to the aspect of the present disclosure and the video decoding method according to the existing standard are used. Here, dedicated decoding processing units ex1001 and ex1002 are not necessarily specialized for the processing contents unique to the aspect of the present disclosure and the existing standard, respectively, and may be also capable of executing other general processing. Also, the configuration according to the seventh exemplary embodiment can be implemented using LSI ex500.

By sharing a decoding processing unit for processing contents that are common to the video decoding method according to an aspect of the present disclosure and the video decoding method according to an existing standard, the circuit scale and cost of LSI can be reduced.

The present disclosure is advantageously used in the image coding apparatus, the image coding method, and the image coding system.

What is claimed is:

1. An image coding method for coding an current block included in an image, the image coding method comprising:
    selecting a first prediction direction from a first prediction direction set that is part of a plurality of previously determined prediction directions, and includes one or more of the prediction directions; and
    performing intra prediction on the current block by using a pixel of an adjacent block that is adjacent to the current block based on the selected first prediction direction,
    wherein the first prediction direction is selected from one or more prediction directions included in the first prediction direction set, based on a prediction pixel generated by copying the pixel of the adjacent block, the prediction pixel being generated without filtering.

2. The image coding method according to claim 1, wherein the first prediction direction set includes the prediction directions of from two to five.

3. The image coding method according to claim 2, wherein, among two or more prediction directions included in the first prediction direction set, absolute values of angles made by the prediction directions adjacent to each other is identical.

4. The image coding method according to claim 2, wherein the first prediction direction set includes five directions of the block, including a horizontal direction, a vertical direction, and oblique directions that each halve an angle between the horizontal direction and the vertical direction.

5. The image coding method according to claim 2, wherein, in the selecting the first prediction direction, the first prediction direction is compared with at least one of DC prediction and planar prediction to update the first prediction direction to one direction in which distortion of a prediction image generated by the intra prediction becomes smallest.

6. The image coding method according to claim 2, further comprising:
    selecting a second prediction direction from a second prediction direction set that is another part of the plurality of prediction directions based on the first prediction direction,
    wherein, in the performing intra prediction, the intra prediction is performed based on the second prediction direction.

7. The image coding method according to claim 6, wherein, when the first prediction direction is one of the DC prediction and the planar prediction, the second selection step is skipped, and in the performing intra prediction, the intra prediction is performed on the current block by using the first prediction direction.

8. The image coding method according to claim 2, wherein, in the selecting the first prediction direction, the first prediction direction is selected by comparison of two or more prediction pixels that are generated by copying, without filtering, the pixel of the adjacent block based on each of the two or more prediction directions included in the first prediction direction set.

9. The image coding method according to claim 6, wherein, in the selecting the second prediction direction, the second prediction direction is selected by comparison of a difference between a distortion amount obtained by the intra prediction on the first prediction direction and a distortion amount obtained by the intra prediction on the prediction direction that is adjacent to the first prediction direction.

10. The image coding method according to claim 9, wherein, in the selecting the second prediction direction, when the difference is larger than a predetermined value, the second prediction direction set is selected such that a largest acute angle is equal to or less than a predetermined angle, the largest acute angle having a maximum value among acute angles made by prediction directions included in the second prediction direction set, and when the difference is equal to or less than the predetermined value, the second prediction direction set is selected such that the largest acute angle is larger than the predetermined angle.

11. An image coding apparatus for coding an current block included in an image, the image coding apparatus comprising:

a processor; and a memory coupled to the processor, wherein the processor executes:

selecting a first prediction direction from a first prediction direction set that is part of a plurality of previously determined prediction directions, and includes one or more of the prediction directions; and performing intra prediction on the current block by using a pixel of an adjacent block that is adjacent to the current block based on the selected first prediction direction, wherein the first prediction direction is selected from one or more prediction directions included in the first prediction direction set based on a prediction pixel generated by copying the pixel of the adjacent block, the prediction pixel being generated without filtering.

* * * * *